US 8,160,636 B2

(12) United States Patent
Tadokoro

(10) Patent No.: US 8,160,636 B2
(45) Date of Patent: Apr. 17, 2012

(54) SEMICONDUCTOR DEVICE

(75) Inventor: Asami Tadokoro, Tokyo (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 718 days.

(21) Appl. No.: 11/955,734

(22) Filed: Dec. 13, 2007

(65) Prior Publication Data

US 2008/0143531 A1   Jun. 19, 2008

(30) Foreign Application Priority Data

Dec. 18, 2006   (JP) ................................ 2006-339304

(51) Int. Cl.
H04B 5/00        (2006.01)
H04B 7/00        (2006.01)
H04B 1/28        (2006.01)
H04B 1/38        (2006.01)

(52) U.S. Cl. .................. 455/550.1; 455/41.1; 455/41.2; 455/333; 455/343.1; 455/558

(58) Field of Classification Search ........ 455/41.1–41.3, 455/217, 298–299, 343.1–343.4, 572, 193.1–193.3, 455/269–276.1, 550.1, 558, 333; 340/572.1
See application file for complete search history.

(56) References Cited

U.S. PATENT DOCUMENTS

| 4,841,227 A | 6/1989 | Maier |
| 5,173,835 A | 12/1992 | Cornett et al. |
| 5,189,593 A | 2/1993 | Ooi |
| 5,283,462 A | 2/1994 | Stengel |
| 5,483,207 A | 1/1996 | Gabara |
| 5,736,728 A | 4/1998 | Matsubara |
| 5,774,062 A * | 6/1998 | Ikefuji .......................... 340/10.4 |
| 5,815,355 A * | 9/1998 | Dawes ............................. 361/56 |
| 5,831,257 A * | 11/1998 | Yamaguchi .................... 235/492 |
| 6,097,292 A | 8/2000 | Kelly et al. |
| 6,427,065 B1 * | 7/2002 | Suga et al. .................... 455/41.1 |
| 6,621,467 B1 | 9/2003 | Marsh |
| 6,685,096 B1 * | 2/2004 | Degrauwe et al. ............ 235/492 |
| 6,778,023 B2 | 8/2004 | Christensen |
| 6,799,015 B1 | 9/2004 | Tiwari |
| 6,809,952 B2 | 10/2004 | Masui |
| 6,879,809 B1 | 4/2005 | Vega et al. |
| 6,906,596 B2 | 6/2005 | Kitamura et al. |
| 7,097,109 B2 * | 8/2006 | Berger .......................... 235/492 |
| 7,142,117 B2 * | 11/2006 | Watanabe ................... 340/572.1 |
| 7,218,204 B2 * | 5/2007 | Hayashi ..................... 340/10.34 |
| 7,224,241 B2 | 5/2007 | Jue |
| 7,255,283 B2 | 8/2007 | Akaida et al. |
| 7,311,246 B2 | 12/2007 | Arisawa |
| 7,324,040 B2 | 1/2008 | Kunc et al. |
| 7,423,517 B2 | 9/2008 | Kofler |

(Continued)

FOREIGN PATENT DOCUMENTS

JP   11-133860   5/1999

(Continued)

*Primary Examiner* — Simon Nguyen
(74) *Attorney, Agent, or Firm* — Husch Blackwell LLP

(57) ABSTRACT

A semiconductor device is provided, which comprises a first circuit including a variable resistance element, a second circuit electrically connected to the first circuit, and an antenna circuit configured to supply power to the first circuit. A resistance value of the variable resistance element is changed in accordance with the power supplied from the antenna circuit, and the variable resistance element is electrically connected in series between the second circuit and the antenna circuit.

27 Claims, 13 Drawing Sheets

U.S. PATENT DOCUMENTS

| | | | |
|---|---|---|---|
| 7,424,265 B2 | 9/2008 | Umeda et al. | |
| 7,424,266 B2 | 9/2008 | Ootaka et al. | |
| 7,436,286 B2 | 10/2008 | Fischer et al. | |
| 7,443,135 B2 | 10/2008 | Cho | |
| 7,703,677 B2 | 4/2010 | Alihodzic | |
| 7,714,633 B2 | 5/2010 | Kato | |
| 7,782,040 B2 * | 8/2010 | Enomoto | 323/293 |
| 7,816,990 B2 | 10/2010 | Hijikata et al. | |
| 7,840,181 B2 | 11/2010 | Umeda et al. | |
| 7,850,086 B2 * | 12/2010 | Nakane et al. | 235/492 |
| 2004/0145034 A1 | 7/2004 | Fujioka et al. | |
| 2005/0280509 A1 | 12/2005 | Tanaka et al. | |
| 2006/0094425 A1 | 5/2006 | Mickle et al. | |
| 2006/0286938 A1 * | 12/2006 | Murdoch | 455/73 |
| 2007/0087719 A1 * | 4/2007 | Mandal et al. | 455/299 |
| 2008/0083969 A1 | 4/2008 | Osada | |
| 2008/0094180 A1 | 4/2008 | Kato et al. | |
| 2008/0266729 A1 * | 10/2008 | Brandl et al. | 361/56 |
| 2008/0311850 A1 | 12/2008 | Ootaka et al. | |
| 2008/0318523 A1 | 12/2008 | Umeda et al. | |
| 2009/0057416 A1 | 3/2009 | Kato | |
| 2010/0148845 A1 | 6/2010 | Kato | |

FOREIGN PATENT DOCUMENTS

| | | |
|---|---|---|
| JP | 2002-176141 | 6/2002 |
| JP | 2002 368647 | 12/2002 |
| JP | 2002-368647 | 12/2002 |
| JP | 2006-5651 | 1/2006 |

* cited by examiner

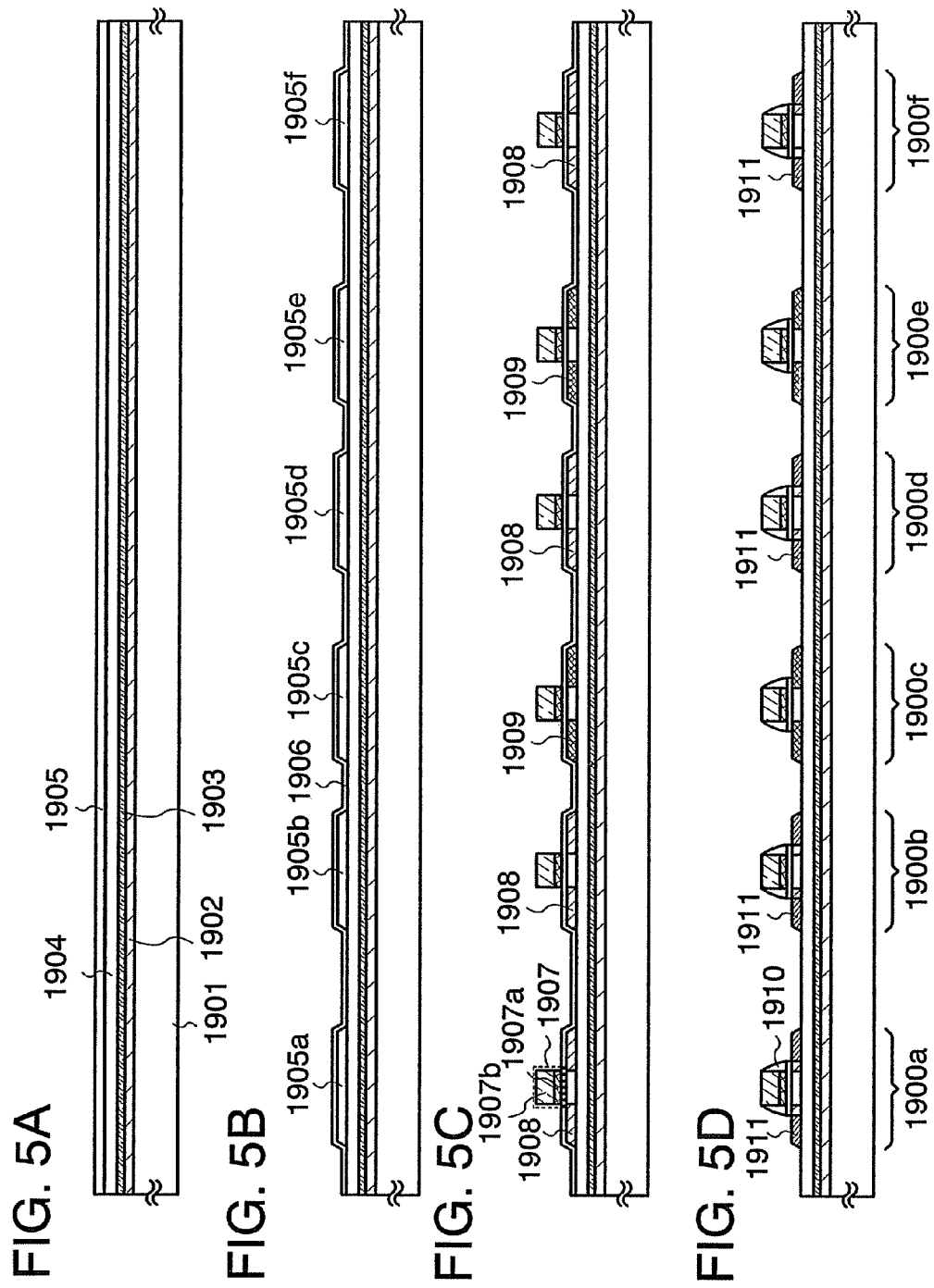

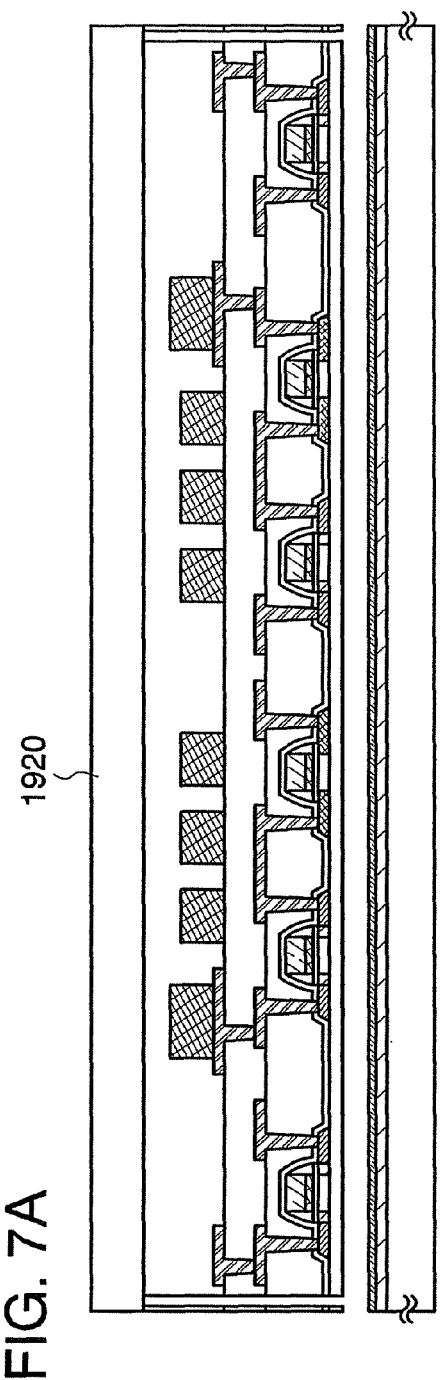
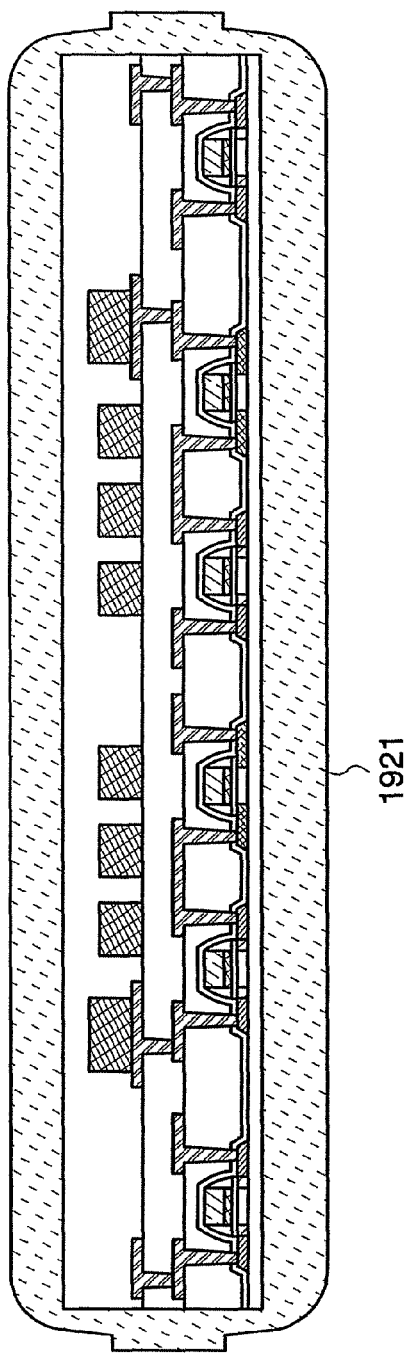
FIG. 7A
FIG. 7B

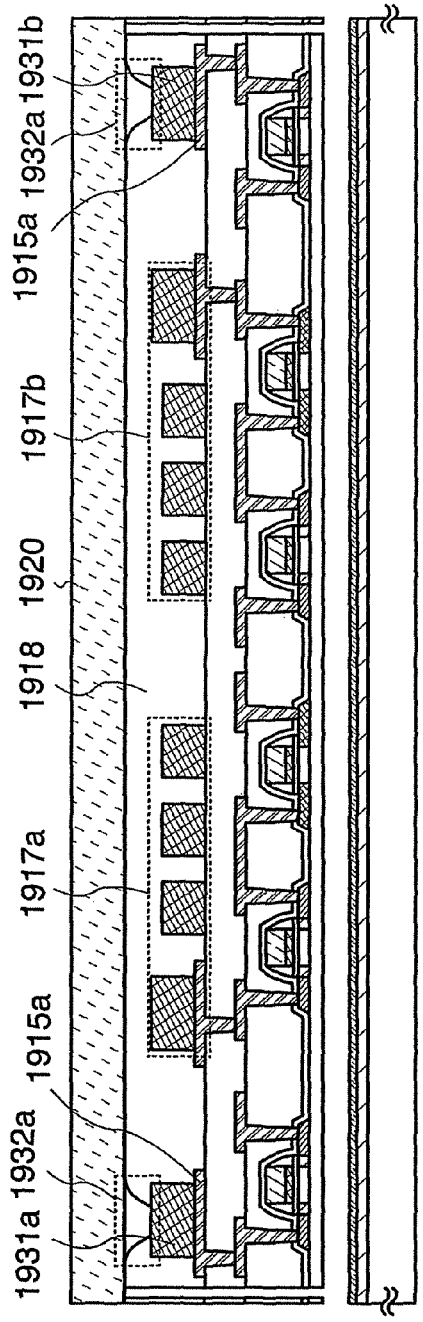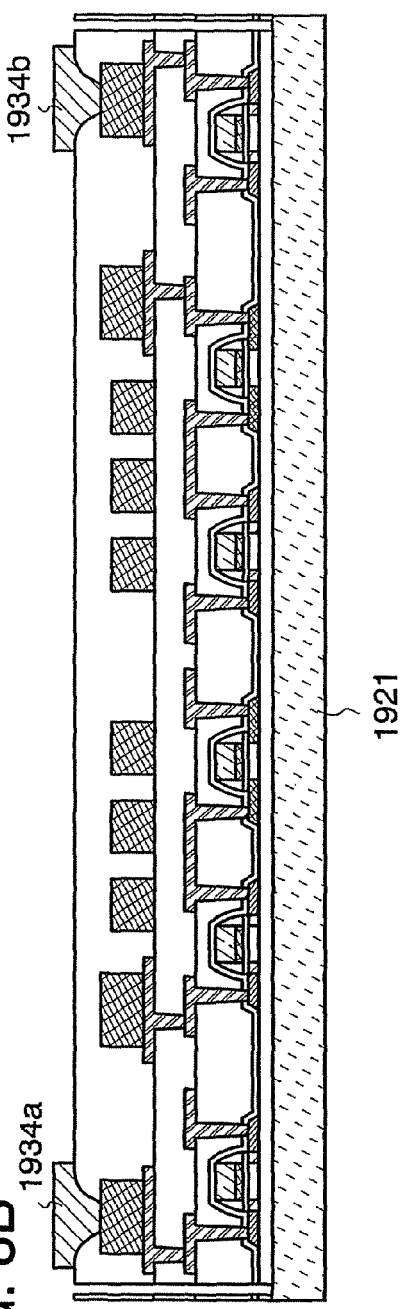

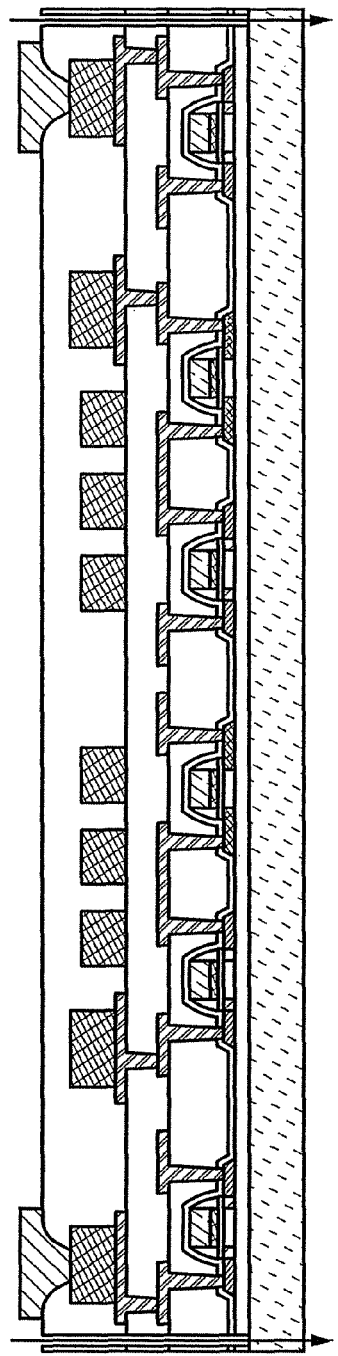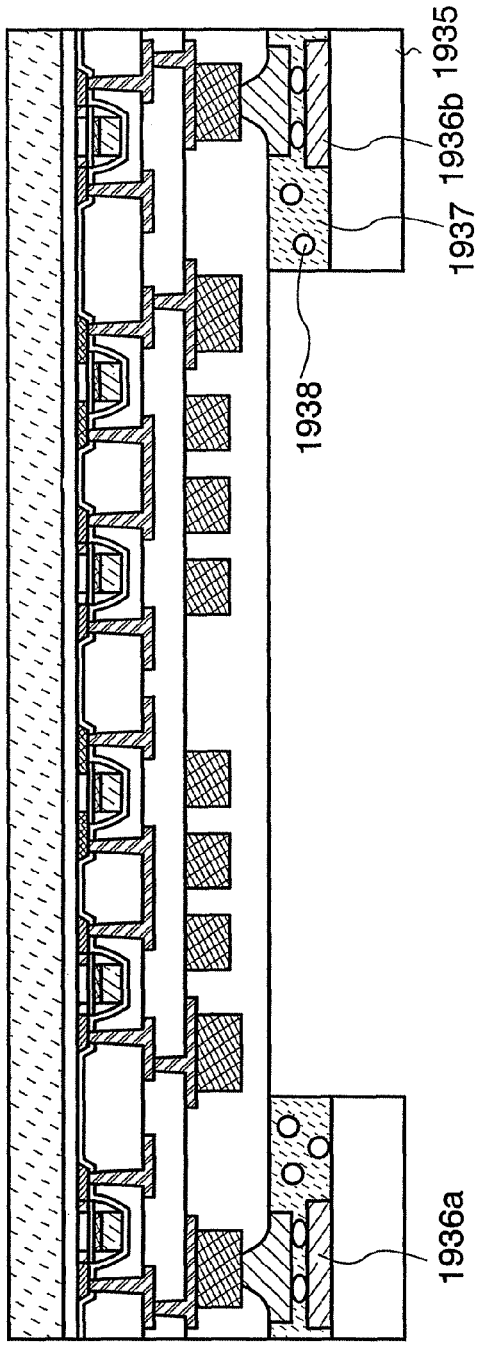
FIG. 9A
FIG. 9B

SEMICONDUCTOR DEVICE

BACKGROUND OF THE INVENTION

1. Field of the Invention

The present invention relates to a semiconductor device which transmits and receives data by wireless communication. Further, the present invention relates to a semiconductor device which can prevent deterioration of element characteristics and destruction of the element of the semiconductor device in the case where the semiconductor device receives high power in wireless communication.

2. Description of the Related Art

In recent years, research and development on increasing power supply efficiency from a reader/writer to an RF tag has been actively conducted in order to expand a response range in wireless communication system.

In general, power decays in proportion to square of distance from a spot where power is emitted to an observation spot. That is, power to be applied to an RF tag is high as distance (hereinafter referred to as communication distance) between a reader/writer and the RF tag is short, and power to be applied to the RF tag is small as the communication distance is long.

Even in the case where power which can be received by an RF tag is small, such as the case where the communication distance is long, it is necessary to reduce power consumption of the RF tag as one of means of normal communication. In order to realize low power consumption of the RF tag, transistors which have been driven at a low voltage have been used in many cases.

On the other hand, even in the case where power which can be received by the RF tag is high, such as the case where the communication distance is short, research and development has been conducted for stable communication (e.g., Reference 1: Japanese Published Patent Application No. 2002-368647).

SUMMARY OF THE INVENTION

However, as described in Reference 1, in a method for changing a Q value by use of a variable resistance circuit which is connected in parallel to an antenna circuit between input terminals, in the case of short communication distance, signals transmitted from an RF tag are made to be easily read by supplying a large current to an element; therefore, there is a problem in that a large burden is placed on an element inside the RF tag.

For example, in the case where the communication distance is very short when a reader/writer and an RF tag are in contact with each other or in the case where the distance between the reader/writer and the RF tag is sharply reduced, the RF tag receives enormous power. In particular, when high power is supplied to an RF tag with the use of a semiconductor integrated circuit formed of a transistor which is driven at a low voltage, deterioration of an element characteristic or destruction of the element easily occurs.

The RF tag receives high power, so that deterioration of an element characteristic or destruction of the element inside the RF tag occurs. As a result, a circuit inside the RF tag does not function normally and malfunction occurs in some cases. In the worst case, the circuit inside the RF tag could not operate.

As an effective measure to prevent deterioration of an element characteristic or destruction of the element due to application of high power, there is a method for connecting a fuse to an input terminal of a semiconductor device; however, in the case where a circuit operates with low power consumption, such as an RF tag, power is largely lost; therefore, the circuit is not adopted so much.

In view of the foregoing problem, an object of the present invention is to provide a semiconductor device which can prevent deterioration of an element characteristic or destruction of the element, suppress power loss, and communicate in a wide range, even in the case where the communication distance is very short or the case where distance between a reader/writer and an RF tag is sharply reduced.

Further, an object of the present invention is to provide a semiconductor device which can prevent deterioration of an element characteristic or destruction of the element, suppress power loss, and communicate in a wide range, even in the case where the communication distance is very short or the case where distance between a reader/writer and an RF tag is sharply reduced.

In the present invention, a protection circuit is provided on an input side of a semiconductor device, and the protection circuit is made to receive power received by an antenna circuit. For the protection circuit, a variable resistance element of which resistance value is changed in accordance with the amount of inputted power is used. The variable resistance element is connected in series between an input terminal of the semiconductor device and a circuit of the next stage of the protection circuit.

When power is inputted from an antenna to the semiconductor device, the power is inputted to the protection circuit. The variable resistance element included in the protection circuit has a high resistance value as inputted power is high; while it has a low resistance value as inputted power is small. In the case where the resistance value of the variable resistance element is kept low, inputted power is not consumed so much by the variable resistance element and outputted to the circuit of the next stage. On the other hand, when the resistance value of the variable resistance element is high, inputted power is consumed by the variable resistance element because the variable resistance element is connected in series between the input terminal of the semiconductor device and the circuit of the next stage of the protection circuit. Therefore, power smaller than the power inputted to the semiconductor device is inputted to the circuit of the next stage of the protection circuit.

When the resistance value of the variable resistance element increases, impedance matching between the antenna and the semiconductor device is not obtained, and power itself inputted to the semiconductor device can be reduced by reflection.

Note that in the present invention, in a circuit provided on an input side or an output side of a semiconductor device such as a rectifier circuit portion for converting an alternating current into a direct current, a demodulation circuit portion which demodulates a signal, or a modulation circuit portion which modulates a signal, a variable resistance element may be used as a semiconductor element, and the variable resistance element may function as a protection circuit.

In the present invention, the variable resistance element means a general semiconductor element of which resistance value is changed in accordance with the amount of inputted power. For example, a transistor, a Schottky barrier diode, or the like can be used as the variable resistance element. In addition, even when a resistor of which resistance value is not changed in accordance with inputted power is used, a plurality of the resistors is used and a switching element switches connection of the resistors, so that the resistors can function as a variable resistance element. In addition, a plurality of transistors can be used as the variable resistance element. The plurality of transistors is connected in series, and gate electrodes included in the plurality of transistors are all connected.

By use of the present invention, in the case where the communication distance is very short such as the case where the reader/writer and the semiconductor device are in contact with each other, or the case where distance between the reader/writer and the semiconductor device is sharply reduced, power supply from the antenna circuit can be limited, and deterioration or destruction of an element of a semiconductor device can be prevented. Therefore, stable communication can be performed in the semiconductor device, and reliability can be improved. Furthermore, since stable power supply voltage can be supplied from a built-in battery, the semiconductor device can operate normally while power supply from the antenna circuit is limited.

BRIEF DESCRIPTION OF THE DRAWINGS

FIGS. 5A to 5D are diagrams showing a method for manufacturing a semiconductor device of the present invention.

FIGS. 7A and 7B are diagrams showing a method for manufacturing a semiconductor device of the present invention.

FIGS. 8A and 8B are diagrams showing a method for manufacturing a semiconductor device of the present invention.

FIGS. 9A and 9B are diagrams showing a method for manufacturing a semiconductor device of the present invention.

DETAILED DESCRIPTION OF THE INVENTION

Embodiment Mode

Figure 1:
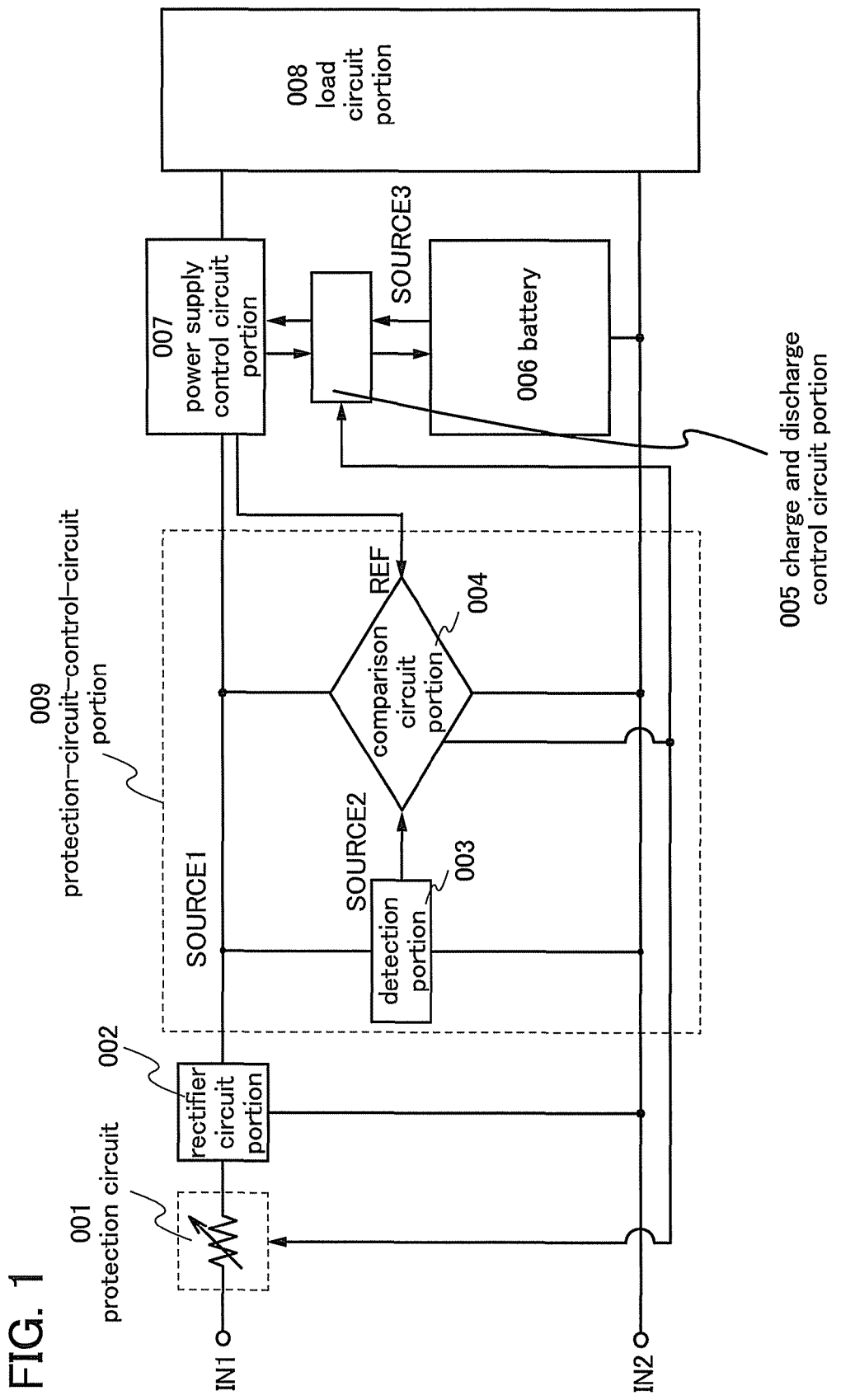
FIG. 1 is a block diagram showing Embodiment Mode of the present invention.

Hereinafter, Embodiment Mode and Embodiments of the present invention will be described with reference to the accompanying drawings. However, the present invention can be implemented in various modes. As can be easily understood by those skilled in the art, the modes and details of the present invention can be changed in various ways without departing from the spirit and scope of the present invention. Thus, the present invention should not be interpreted as being limited to the following description of Embodiment Mode and Embodiments. Note that in all the drawings for describing Embodiment Mode and Embodiments, the same portions or portions having similar functions are denoted by the same reference numerals, and repeated description thereof is omitted.

In this specification, "to be connected" means "to be electrically connected."

In this specification, a battery refers to a battery which can restore continuous operating time by being charged.

In this specification, various types of transistors can be applied to a transistor without limiting to a certain type. Accordingly, a thin film transistor (TFT) using a non-single crystalline semiconductor film typified by amorphous silicon or polycrystalline silicon, a transistor formed by use of a semiconductor substrate or an SOI substrate, a junction transistor, a bipolar transistor, a transistor using a compound semiconductor such as ZnO or a-InGaZnO, a transistor using an organic semiconductor or a carbon nanotube, or other transistors can be employed. Note that a non-single crystalline semiconductor film may include hydrogen or halogen. In addition, various types of substrates can be used for a substrate to which transistors are arranged without limitation on a certain type. Therefore, for example, a single crystalline semiconductor substrate, an SOI substrate, a glass substrate, a quartz substrate, a plastic substrate, a paper substrate, a cellophane substrate, or the like can be used. Further, the transistor may be formed using one substrate, and then, the transistor may be transferred to another substrate.

When circuits are formed over one substrate, cost can be reduced by reduction in the number of components, and reliability can be improved by reduction in the number of connection points with other circuit components. Alternatively, part of a circuit may be formed over one substrate and other part of the circuit may be formed over another substrate. In other words, not all of the circuits are necessary to be formed over one substrate. For example, part of a circuit may be formed over a glass substrate using transistors and other part of the circuit may be formed using a single crystalline semiconductor substrate, and an IC chip may be connected to the transistor by COG (chip on glass), so that the IC chip may be provided over the glass substrate. Alternatively, the IC chip may be connected to a glass substrate using TAB (tape automated bonding) or a printed wiring board. In such a manner, when part of a circuit is formed over one substrate, cost can be reduced by reduction in the number of components, and reliability can be improved by reduction in the number of connection points between the circuits and the components. In addition, when part of a circuit with a high driving voltage or a high driving frequency is formed using different substrate from the other part of the circuit, increase in power consumption can be prevented.

A transistor applied to a semiconductor device of the present invention may have, for example, a multi-gate structure where the number of gates is two or more. With a multi-gate structure, an off current can be reduced, reliability can be improved by improvement of the pressure resistance of a transistor, and flat characteristics can be obtained because a current between a source terminal and a drain terminal does not change so much even when a voltage between the source terminal and the drain terminal is changed at the time of the operation in a saturation region. In addition, gate electrodes may be provided over and under a channel. Accordingly, a channel formation region is increased, so that the amount of current can be increased and a subthreshold swing (S value) can be set small because a depletion layer is easily formed. Moreover, a structure of a transistor may be any of the following structures: a structure in which a gate electrode is provided over the channel, a structure in which a gate electrode is provided under the channel, a forward staggered structure, or an inverted staggered structure. A channel formation region may be divided into a plurality of regions, or a source region and a drain region with each of a plurality of channel formation regions interposed therebetween may be connected in parallel or in series. Further, a source electrode or a drain electrode may overlap a channel formation region (or part thereof), thereby preventing a charge from being accumulated in part of the channel and an unstable operation. Furthermore, an LDD region may be provided in a source region and a drain region. By provision of an LDD region, an off current can be reduced and reliability can be improved by improvement of the pressure resistance of a transistor, and flat characteristics can be obtained because a current between the source terminal and the drain terminal does not change so much even when a voltage between the source terminal and the drain terminal is changed at the time of the operation in a saturation region.

This embodiment mode of the present invention will be described with reference to FIG. 1.

A semiconductor device in this embodiment mode of the present invention includes at least two input-output terminals. In this specification, one of the two input-output terminals is referred to as IN1, and the other thereof is referred to as IN2.

The semiconductor device of this embodiment mode includes a protection circuit 001 using a variable resistance element which normally has high conductivity and can change a resistance value in accordance with an electrical signal. In the protection circuit 001, the variable resistance element is connected in series between an input terminal and an output terminal. In accordance with the electrical signal, a resistance value between the input terminal and the output terminal can be changed. Further, the semiconductor device of the present invention includes a protection-circuit-control-circuit portion 009 for controlling the protection circuit 001, a rectifier circuit portion 002 for rectifying an alternating current into a direct current, a power supply control circuit portion 007 for stabilizing a rectified voltage, a battery 006, a charge and discharge control circuit portion 005 for controlling a charging and discharging mechanism of the battery 006, and a load circuit portion 008.

The protection-circuit-control-circuit portion 009 includes a detection portion 003 for detecting power (input power) inputted from the outside and a comparison circuit portion 004.

In this specification, a voltage rectified in the rectifier circuit portion 002 is referred to as SOURCE1. In addition, a voltage detected in the detection portion 003 for detecting an input voltage from the outside is referred to as SOURCE2. Further, a voltage discharged from the battery 006 is referred to as SOURCE3.

When an AC voltage is inputted from IN1 through the protection circuit 001 to the rectifier circuit portion 002, the rectifier circuit portion 002 converts the AC voltage into a DC voltage. In this specification, "to convert an alternating current into a direct current in the rectifier circuit portion 002" means "to rectify".

The rectifier circuit portion 002 outputs SOURCE1 to the protection-circuit-control-circuit, portion 009 and the power supply control circuit portion 007.

When SOURCE1 is inputted to the power supply control circuit portion 007, the power supply control circuit portion 007 stabilizes SOURCE1 and supplies the stabilized SOURCE1 to the load circuit portion 008. In addition, the power supply control circuit portion 007 determines a voltage REF to serve as a reference, and outputs the voltage REF to the comparison circuit portion 004. Further, the power supply control circuit portion 007 stabilizes SOURCE3 discharged from the battery 006, and supplies the stabilized SOURCE3 to the load circuit portion 008.

When SOURCE1 is detected in the detection portion 003 for detecting an input voltage from the outside, the protection-circuit-control-circuit portion 009 outputs a detection result to the comparison circuit portion 004 as SOURCE2. The comparison circuit portion 004 compares the SOURCE2 with a reference voltage REF inputted from the power supply control circuit portion 007 and outputs a comparison result to the charge and discharge control circuit portion 005.

When the SOURCE2 is the same as or less than the reference voltage REF, the comparison circuit portion 004 controls a resistance value of the variable resistance element included in the protection circuit 001 in such a way that the resistance value is kept low. When the SOURCE2 is larger than the reference voltage REF, the comparison circuit portion 004 controls to increase the resistance value of the variable resistance element included in the protection circuit 001.

When the resistance value of the variable resistance element included in the protection circuit 001 is very low, SOURCE1 has the amount of a voltage that reflects a voltage inputted to IN1. Meanwhile, when the resistance value of the variable resistance element included in the protection circuit 001 is high, an input voltage which is inputted from IN1 is consumed in the variable resistance element included in the protection circuit 001; therefore, a voltage inputted to the rectifier circuit portion 002 is lower than that in the case where the resistance value of the variable resistance element included in the protection circuit 001 is low.

By use of this embodiment mode, in the case where power inputted to IN1 is larger than necessary, dump power can be consumed in the protection circuit 001; therefore, deterioration of an element characteristic in the semiconductor device or destruction of the element in the semiconductor device due to high power application can be prevented.

In the case of being observed from the outside, an input impedance when the resistance value of the variable resistance element included in the protection circuit 001 is very low looks different from an input impedance when the resistance value of the variable resistance element included in the protection circuit 001 is high.

In general, in the case where a semiconductor device is designed so that power supplied from the outside is used most efficiently at the time of one input impedance, when another circuit is connected to the semiconductor device and an input impedance is changed, power supplied from the outside is inefficiently used.

By use of this property in this embodiment mode, power supplied from the outside is designed so as to be used most efficiently when the resistance value of the variable resistance element included in the protection circuit 001 is very low, and power supplied from the outside is designed so as to be used inefficiently when the resistance value of the variable resistance element is high, compared with the case where the resistance value of the variable resistance element is very low.

By use of this embodiment mode, in accordance with the amount of power inputted to IN1, an input impedance can be controlled and power transmitted to the inside of the semiconductor device can be controlled; therefore, deterioration of an element characteristic in the semiconductor device or destruction of the element in the semiconductor device due to high power application can be prevented.

Here, in the case where the resistance value of the variable resistance element included in the protection circuit 001 is high and SOURCE1 is too small to drive the power supply control circuit portion 007 normally, the charge and discharge control circuit portion 005 makes the battery 006 discharge.

SOURCE3 which is discharged from the battery 006 is outputted to the power supply control circuit portion 007 through the charge and discharge control circuit portion 005. The power supply control circuit portion 007 stabilizes SOURCE3 and supplies the stabilized SOURCE3 to the load circuit portion 008.

By use of this embodiment mode, also in the case where power transmitted in the semiconductor device is too small, power can be compensated from the battery 006; therefore, the semiconductor device can operate normally without deterioration of the element characteristic in the semiconductor device or destruction of the element in the semiconductor device.

Note that in this embodiment mode, the case where an input voltage is detected in the detection portion 003 and compared with the reference voltage REF determined in the power supply control circuit portion 007 has been described; however, a structure may be used in which an input current is detected in the detection portion 003 and compared with the reference current REF determined in the power supply control circuit portion 007.

Embodiment 1

Figure 2:
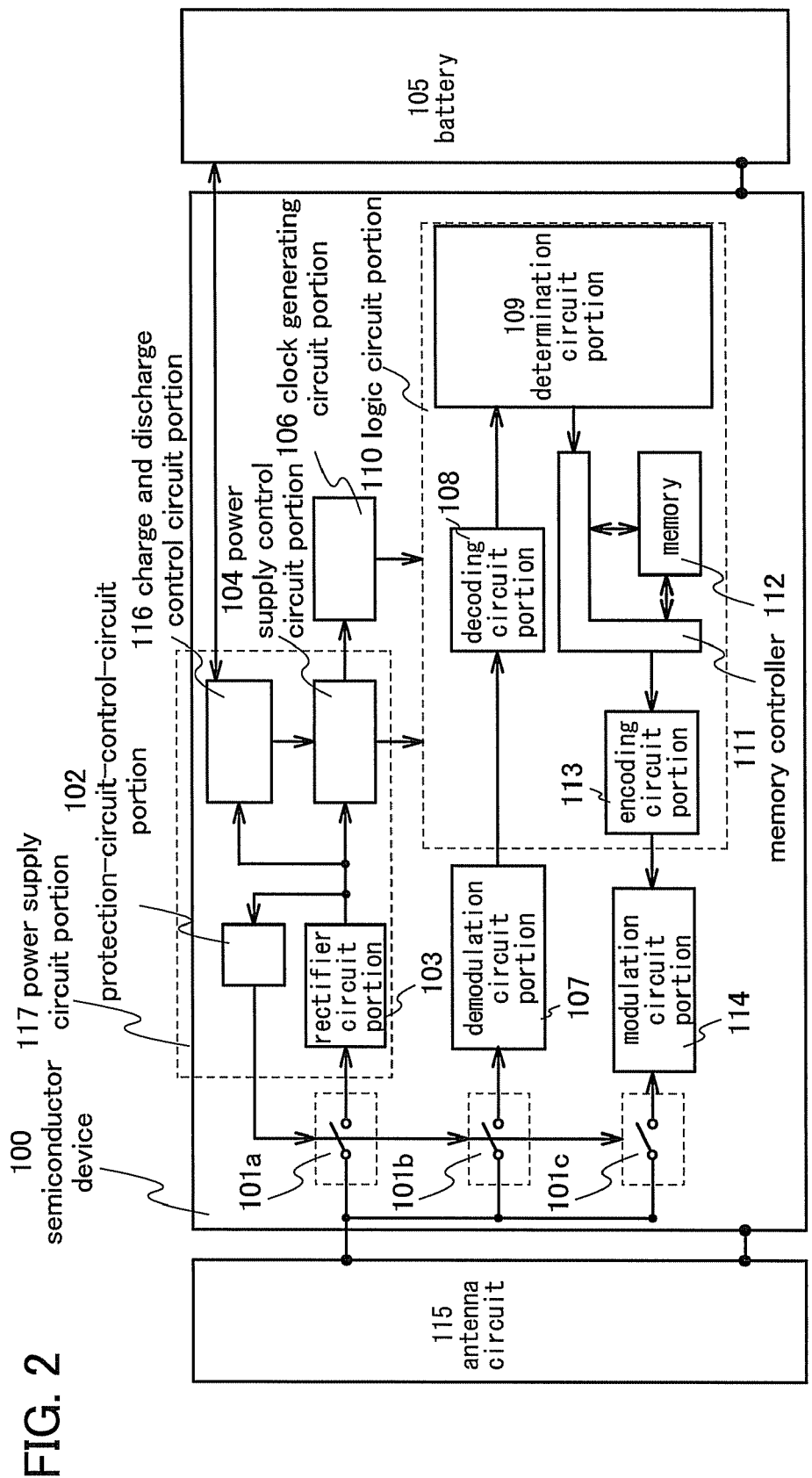
FIG. 2 is a block diagram showing one structural example of Embodiment 1 of the present invention.

Next, a structure of a semiconductor device of the present invention will be described with reference to FIG. 2.

An antenna circuit 115 for communicating with a reader/writer wirelessly is connected to a semiconductor device 100. In this embodiment, a structure of a semiconductor device without including an antenna circuit is described; however, a semiconductor device may include an antenna circuit in its structure.

The semiconductor device 100 of this embodiment includes protection circuits 101a to 101c each using a variable resistance element which normally has high conductivity and can change a resistance value in accordance with an electrical signal; a power supply circuit portion 117; a logic circuit portion 110; a clock generating circuit portion 106 for generating a clock which is supplied to the logic circuit portion 110; a demodulation circuit portion 107 for demodulating wireless communication data from a reader/writer received by the antenna circuit 115; a modulation circuit portion 114 for modulating data outputted from the logic circuit portion 110; and a battery 105.

Furthermore, the power supply circuit portion 117 includes a protection-circuit-control-circuit portion 102 for controlling the protection circuits 101a to 101c, a rectifier circuit portion 103 for converting an alternating current into a direct current, a power supply control circuit portion 104 for supplying stable power to an internal circuit of the semiconductor device 100, and a charge and discharge control circuit portion 116 for controlling charging and discharging of the battery 105. The battery 105 is charged while electric waves are received from the reader/writer and discharges in accordance with a demand of the charge and discharge control circuit portion 116.

The protection-circuit-control-circuit portion 102 includes a detection portion which detects an input voltage and a comparator portion which compares the input voltage with a reference voltage REF generated in the power supply control circuit portion 104.

The logic circuit portion 110 includes a decoding circuit portion 108 for decoding data demodulated by the demodulation circuit portion 107, a determination circuit portion 109 for determining a decoded instruction, a memory device (hereinafter referred to as a memory) 112 for storing individual identification data of the semiconductor device 100 or added information, a memory controller 111 for controlling the memory 112, and an encoding circuit portion 113 for encoding data outputted from the memory 112 through the memory controller 111. Note that the structure of the logic circuit portion 110 included in the semiconductor device of the present invention is not limited to the structure shown in FIG. 2. In accordance with a function of the semiconductor device, the structure of the logic circuit portion 110 can be changed as appropriate.

As the variable resistance elements included in the protection circuits 101a to 101c, for example a Schottky barrier diode or the like, an element having a property such that self-heating is performed and a resistance value increases by the increase in the amount of current flowing through an element can be used. In the case where an element having a rectifying function such as a Schottky barrier diode is used as a component of the rectifier circuit portion 103, the protection circuits 101a to 101c are not necessarily provided. In the case where the protection circuits 101a to 101c are not provided, the protection-circuit-control-circuit portion 102 is not necessarily used.

The semiconductor device 100 includes at least two input-output terminals for connection with the outside. In this specification, one of two input-output terminals is referred to as IN1, and the other thereof is referred to as IN2. In the semiconductor device 100, IN1 is connected to a +V terminal of the antenna circuit, and IN2 is connected to a −V terminal of the antenna circuit.

An AC voltage is inputted to the rectifier circuit portion 103 through the antenna circuit 115, and the rectifier circuit portion 103 outputs a DC voltage to the power supply control circuit portion 104 and the charge and discharge control circuit portion 116. The protection circuit 101a is provided between the rectifier circuit portion 103 and the antenna circuit 115.

In the case where one transistor is used as the protection circuit 101a, one of a source electrode and a drain electrode of the transistor is connected to IN1, and the other thereof is connected to the rectifier circuit portion 103. Further, a gate electrode of the transistor is connected to the protection-circuit-control-circuit portion 102.

The demodulation circuit portion 107 demodulates wireless communication data inputted through the antenna circuit 115 and outputs demodulated data to the decoding circuit portion 108 in the logic circuit portion 110. The protection circuit 101b is provided between the demodulation circuit portion 107 and the antenna circuit 115.

In the case where one transistor is used as the protection circuit 101b, one of a source electrode and a drain electrode of the transistor is connected to IN1, and the other thereof is connected to the demodulation circuit portion 107. Further, a gate electrode of the transistor is connected to the protection-circuit-control-circuit portion 102.

The modulation circuit portion 114 modulates electric waves from the reader/writer by use of data coded in the encoding circuit portion 113 in the logic circuit portion 110 and transmits the coded data to the reader/writer through the antenna circuit 115. The protection circuit 101c is provided between the modulation circuit portion 114 and the antenna circuit 115.

In the case where one transistor is used as the protection circuit 101c, one of a source electrode and a drain electrode of the transistor is connected to IN1, and the other thereof is connected to the modulation circuit portion 114. Further, a gate electrode of the transistor is connected to the protection-circuit-control-circuit portion 102.

Power is supplied from the power supply control circuit portion 104 to the logic circuit portion 110, and a clock is inputted from the clock generating circuit portion 106 to the logic circuit portion 110. Data demodulated in the demodulation circuit portion 107 is inputted to the logic circuit portion 110, decoded in the decoding circuit portion 108 in the logic circuit portion 110, and outputted to the determination circuit portion 109. When the decoded data is inputted to the determination circuit portion 109, the determination circuit portion 109 decodes the decoded data and the result is determined. The memory controller 111 receives the determination result of the determination circuit portion 109 and outputs data stored in the memory 112. The encoding circuit portion 113 encodes the data outputted from the memory 112 and outputs the coded data to the modulation circuit portion 114.

A voltage or a current rectified in the rectifier circuit portion 103 is inputted to the power supply control circuit portion 104, and the power supply control circuit portion 104 stabilizes the voltage or the current and supplies the stabilized voltage or current to another circuit portion. In addition, the power supply control circuit portion 104 determines a voltage (reference voltage) VREF to serve as a reference and outputs the reference voltage VREF to the protection-circuit-control-circuit portion 102. Note that the case where input power is detected as a voltage in this embodiment; however, the present invention is not limited thereto, and input power may be detected as a current. Since the case where input power is detected as a voltage is given as an example in this embodiment, the reference voltage VREF which is one of reference power REF is used. In the case where input power is detected as a current, a reference current CREF which is one of reference power REF may be used.

A DC voltage rectified in the rectifier circuit portion 103 is inputted to the charge and discharge control circuit portion 116, and the charge and discharge control circuit portion 116 stabilizes an inputted DC voltage and supplies the stabilized DC voltage to the battery 105. The charge and discharge control circuit portion 116 preferably has a function to detect a charging capacity of the battery 105 and to control so as not to overcharge the battery 105. A DC voltage is inputted through the charge and discharge control circuit portion 116 to the battery 105, and the battery 105 is charged. In addition, the battery 105 discharges in accordance with a demand of the charge and discharge control circuit portion 116.

When power is not supplied from the reader/writer to the semiconductor device 100, all of the resistance values of the variable resistance elements in the protection circuits 101a to 101c are very low and in a conductive state. When power is supplied to the semiconductor device 100, an AC voltage received by the rectifier circuit portion 103 is converted into a DC voltage. The DC voltage which has been converted in the rectifier circuit portion 103 is supplied to the power supply control circuit portion 104 and the charge and discharge control circuit portion 116.

The voltage or the current rectified in the rectifier circuit portion 103 is inputted to the protection-circuit-control-circuit portion 102. Note that in this embodiment, a difference between a voltage after rectification and a voltage of IN2 is referred to as a voltage after rectification VIN. The voltage after rectification VIN corresponds to SOURCE1 in Embodiment Mode. When the voltage after rectification VIN is inputted to the protection-circuit-control-circuit portion 102, the voltage after rectification VIN is detected in the detection portion included in the protection-circuit-control-circuit portion 102. The detection portion converts the detected voltage after the rectification VIN into a voltage VIN2 and inputs the voltage VIN2 to the comparator portion. The voltage VIN2 corresponds to SOURCE2 in Embodiment Mode. In addition, the reference voltage VREF generated in the power supply control circuit portion 104 is inputted to the protection-circuit-control-circuit portion 102. The comparator portion compares the voltage VIN2 with the reference voltage VREF, determines which voltage is large, and outputs determination of which voltage is large to the protection circuits 101a to 101c.

As a result of comparison in the protection-circuit-control-circuit portion 102, when the reference voltage (VREF) is larger than the voltage (VIN2) of the detection result, all of the protection circuits 101a to 101c remain in a conductive state, and the semiconductor device operates normally.

At the time of normal operation, when the antenna circuit 115 receives electric waves transmitted from the reader/writer, the semiconductor device 100 demodulates wireless data received in the demodulation circuit portion 107 and outputs the demodulated wireless data to the decoding circuit portion 108. The demodulated data is decoded in the decoding circuit portion 108 and outputted the decoded data to the determination circuit portion 109. The determination circuit portion 109 decodes the decoded data and determines the decoded result. The memory controller 111 receives the determination result of the determination circuit portion 109 and outputs data stored in the memory 112. The encoding circuit portion 113 encodes the data outputted from the memory 112 and outputs the coded data to the modulation circuit portion 114. The data coded in the encoding circuit portion 113 is modulated in the modulation circuit portion 114 and transmits the modulated data to the reader/writer through the antenna circuit 115.

As a result of determination in the protection-circuit-control-circuit portion 102, when the reference voltage (VREF) is smaller than the voltage (VIN2) of the detection result, the variable resistance elements included in the protection circuits 101a to 101c are controlled so that each resistance value increases. That is, a series resistance component of an input portion of the semiconductor device 100 increases.

Each resistance value between the antenna circuit 115 and the rectifier circuit portion 103, between the antenna circuit 115 and the demodulation circuit portion 107, and between the antenna circuit 115 and the modulation circuit portion 114 increases, so that the amount of current flowing into the inside of the semiconductor device 100 is limited. By limiting the amount of current flowing through the element, deterioration of the element characteristic or destruction of the element can be prevented.

When the series resistance component of the input portion of the semiconductor device 100 increases, impedance matching with the antenna circuit 115 is not performed, and transmission efficiency of power decreases. That is, even when the antenna circuit 115 receives high power, high power is not applied to the element in the semiconductor device 100. Accordingly, deterioration or destruction of the element in the semiconductor device 100 can be prevented.

Figure 3:
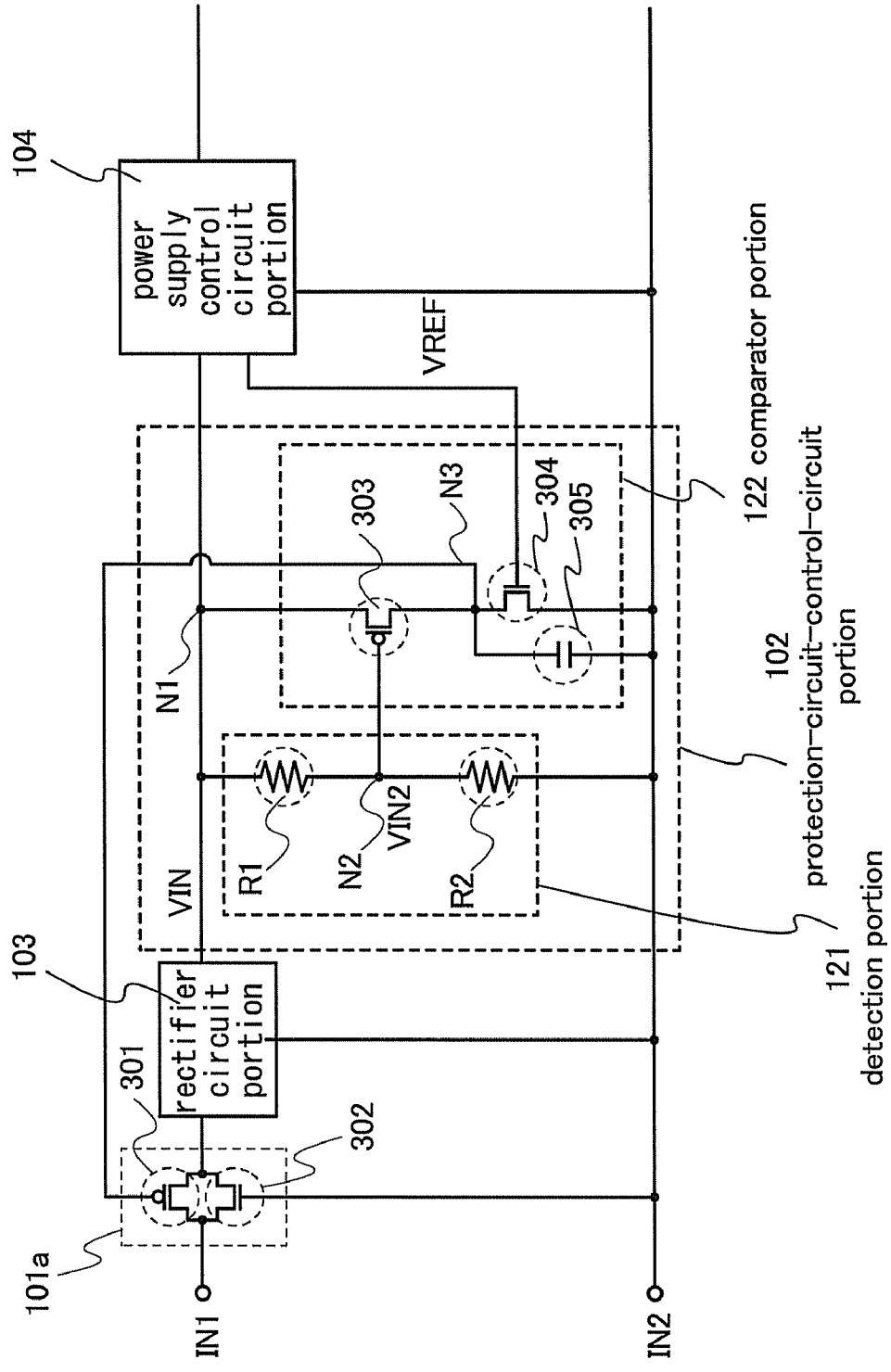
FIG. 3 is a diagram showing one structural example of a protection circuit in Embodiment 1 of the present invention.

A method for controlling the resistance value of the variable resistance element included in the protection circuit 101a will be described with reference to FIG. 3. FIG. 3 shows the protection circuit 101a, the protection-circuit-control-circuit portion 102, the rectifier circuit portion 103, and the power supply control circuit portion 104 of the semiconductor device 100 in this embodiment, and particularly shows an example of a specific circuit structure of the protection circuit 101a and the protection-circuit-control-circuit portion 102.

The protection circuit 101a in FIG. 3 includes a transistor 301 and a transistor 302 as a variable resistance element. One of a source electrode and a drain electrode of the transistor 301 is connected to IN1, and the other thereof is connected to the rectifier circuit portion 103. Further, a gate electrode of the transistor 301 is connected to the protection-circuit-control-circuit portion 102. One of a source electrode and a drain electrode of the transistor 302 is connected to IN1, and the other thereof is connected to the rectifier circuit portion 103. Further, a gate electrode of the transistor 302 is connected to IN2.

The protection-circuit-control-circuit portion 102 includes a detection portion 121 having a resistor R1 and a resistor R2 and a comparator portion 122 having a p-channel transistor 303, an n-channel transistor 304, and a phase compensation capacitor 305.

The resistor R1 and the resistor R2 are sequentially connected in series between a node IN2 and a node N1 to which the voltage after rectification VIN that is an output of the rectifier circuit portion 103 is inputted. One of a source electrode and a drain electrode of the transistor 303 is connected to the node N1, and the other thereof is connected to one of a source electrode and a drain electrode of the transistor 304. A gate electrode of the transistor 303 is connected to the node N2 between the resistor R1 and the resistor R2. A voltage of the node N2 corresponds to the voltage VIN2 of the detection result. The other of the source electrode and the drain electrode of the transistor 304 is connected to IN2, and a reference voltage VREF determined in the power supply control circuit portion 104 is inputted to a gate electrode of the transistor 304.

The phase compensation capacitor 305 is provided between IN2 and a node N3 to which the gate electrode of the transistor 301, the other of the source electrode and the drain electrode of the transistor 303, and the one of the source electrode and the drain electrode of the transistor 304 are connected.

An AC voltage is inputted from IN1 and IN2 to the rectifier circuit portion 103 through the protection circuit 101a, and the rectifier circuit portion 103 supplies a DC voltage to the protection-circuit-control-circuit portion 102.

A potential applied to the gate electrode of the transistor 301, that is, a potential of the node N3 is determined by operation of the transistor 303. That is, in the case where the transistor 304 operates in a saturation region and the transistor 303 is turned off, the potential of the node N3 is approximately the same as the potential of IN2. While in the case where the transistor 304 operates in a saturation region and the transistor 303 is turned on, a current flows from the transistor 303 into the node N3, so that the potential of the node N3 increases. When the potential of the node N3 increases, the transistor 301 does not operate. That is, a current does not flow through the transistor 301, so that input resistance of the protection circuit 101a can be increased.

The transistor 303 operates with a potential difference between the potential of the node N2 and the potential of the node N1. For example, when input power increases and the potential of the node N1 increases, the potential difference between the potential of the node N1 and the potential of the node N2 increases. When the potential difference between the potential of the node N1 and the potential of the node N2 is larger than a threshold value of the transistor 303, the transistor 303 supplies a current, so that the potential of the node N3 increases.

The potential difference between the potential of the node N1 and the potential of the node N2 is determined by the ratio of the resistor R1 to the resistor R2. When the voltage after rectification VIN is a predetermined value or larger, the size of each of the resistor R1 and the resistor R2 is determined so that the potential difference between the potential of the node N1 and the potential of the node N2 is larger than the threshold value of the transistor 303.

When the protection circuits 101a to 101c and the like are added to an input terminal, there is a large input loss, and a sufficient voltage cannot be generated to the node N1 in some cases. However, in this embodiment, since power can be compensated from the battery 105 through the charge and discharge control circuit portion 116, stable communication can be performed even when a sufficient voltage cannot be generated to the node N1.

Figure 4:
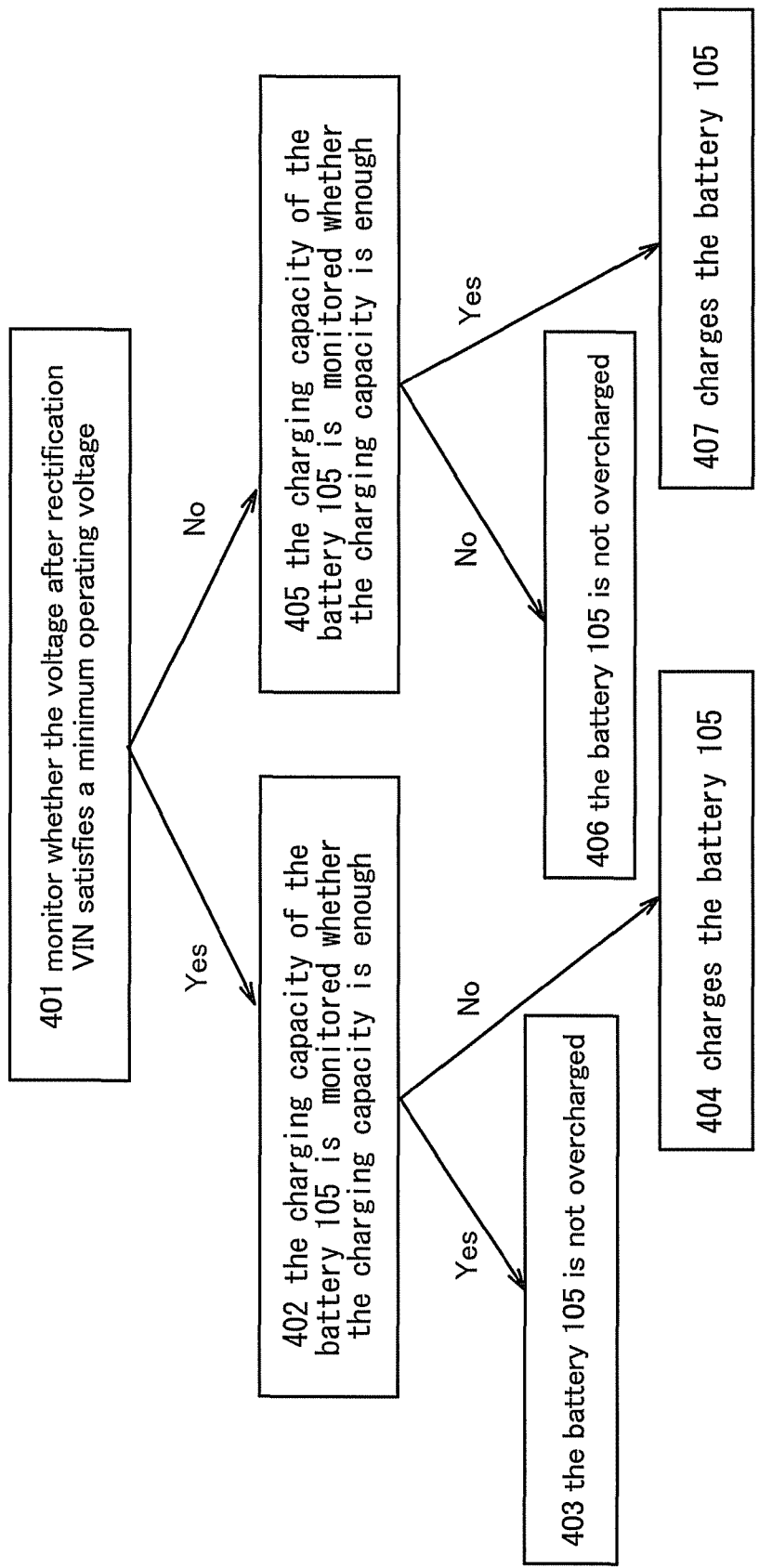
FIG. 4 is a flow chart in which a battery in Embodiment 1 of the present invention is controlled.

Next, steps in which the charge and discharge control circuit portion 116 controls the battery 105 will be described with reference to FIG. 4.

The charge and discharge control circuit portion 116 has a function to monitor the voltage after rectification VIN and the charging capacity of the battery 105. In addition, the charge and discharge control circuit portion 116 has a function to stabilize power supply supplied to the battery 105.

The charge and discharge control circuit portion 116 monitors the voltage after rectification VIN and determines whether the voltage after rectification VIN satisfies a sufficient voltage (minimum operating voltage) to stably operate the power supply control circuit portion 104 (Step 401). Next, the charging capacity of the battery 105 is monitored in both of the case where the minimum operating voltage is satisfied (Yes) and the case where the minimum operating voltage is not satisfied (No), and the charge and discharge control circuit portion 116 determines whether the charging capacity is enough (Steps 402 and 405).

In the case where the voltage after rectification VIN is equal to or larger than the minimum operating voltage, that is, the minimum operating voltage is determined to be satisfied in Step 401 (Yes) and where the charging capacity of the battery 105 is determined to be short in Step 402 (No), the charge and discharge control circuit portion 116 charges the battery 105 (Step 404). When predetermined power supply is continuously supplied to the power supply control circuit portion 104 while the battery 105 is being charged, the semiconductor device can operate in a manner similar to the time of a normal operation.

In the case where the voltage after rectification VIN is equal to or larger than the minimum operating voltage, that is, the minimum operating voltage is determined to be satisfied in Step 401 (Yes), and where the charging capacity of the battery 105 is determined to be enough in Step 402 (Yes), the charge and discharge control circuit portion 116 does not charge the battery 105 so that the battery 105 is not overcharged (Step 403). When the voltage after rectification VIN is equal to or larger than the minimum operating voltage, the semiconductor device can operate normally.

On the other hand, in the case where the voltage after rectification VIN is smaller than the minimum operating voltage, that is, the minimum operating voltage is determined to not be satisfied in Step 401 (No) and where the charging capacity of the battery 105 is determined to be enough in Step 405 (Yes), the charge and discharge control circuit portion 116 discharges the battery 105 (Step 407). Discharged power is supplied to the power supply control circuit portion 104 through the charge and discharge control circuit portion 116. While a predetermined power is continuously supplied to the power supply control circuit portion 104, the semiconductor device can operate in a manner similar to the time of a normal operation.

In the case where the voltage after rectification VIN is smaller than the minimum operating voltage, that is, the minimum operating voltage is determined to not be satisfied in Step 401 (No) and where the charging capacity of the battery 105 is determined to be short in Step 405 (No), the charge and discharge control circuit portion 116 does not discharge the battery 105 (Step 406).

By use of the present invention, deterioration of the element characteristic or destruction of the element can be prevented even when the communication distance is short and high power is received. In addition, by use of the present invention, stable communication can be performed even when a loss of the input portion is large.

Embodiment 2

Figure 13:
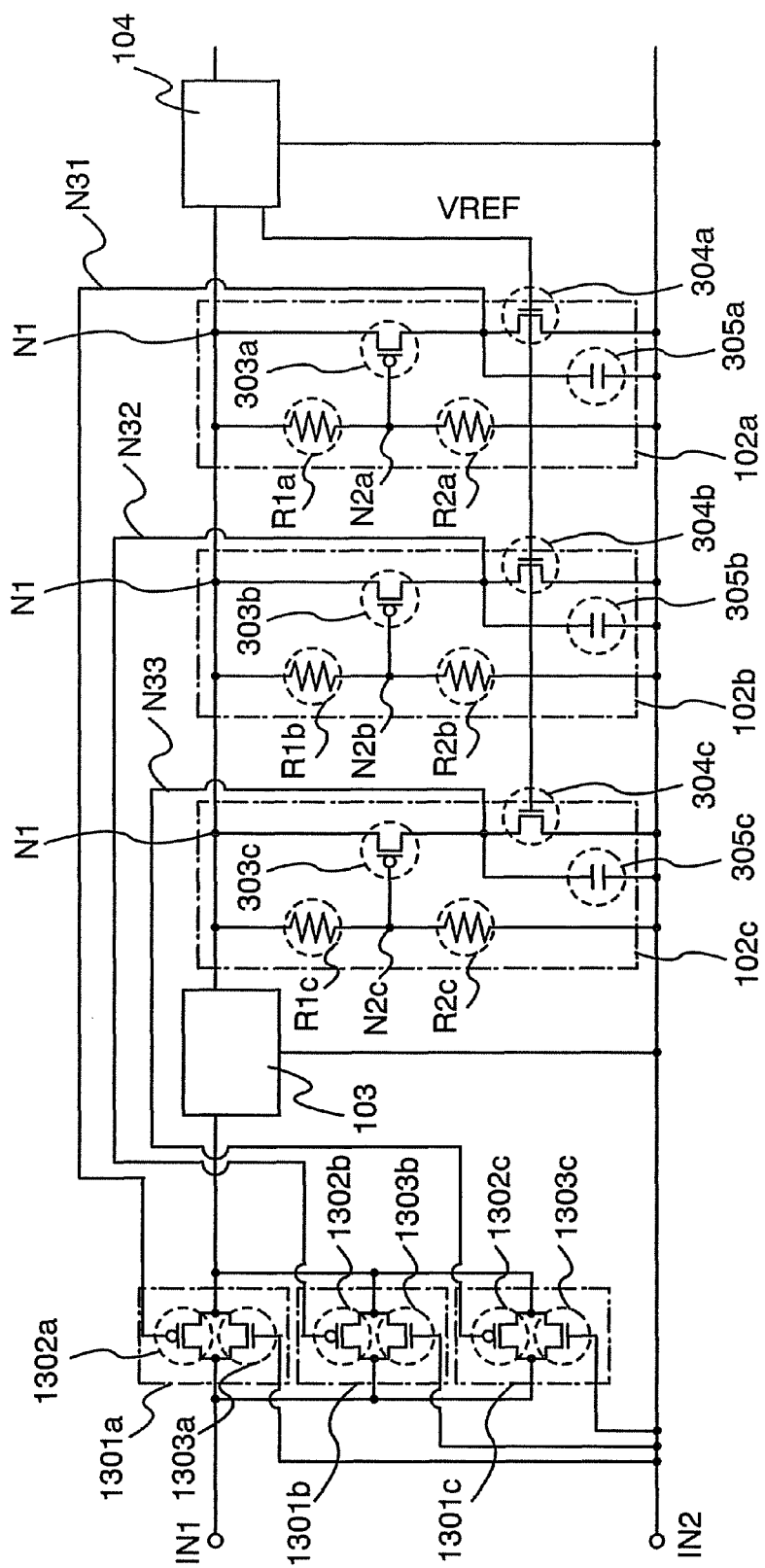
FIG. 13 is a diagram showing one structural example of a protection circuit in Embodiment 2 of the present invention.

In this embodiment, a method for controlling the resistance value of the variable resistance element included in the protection circuit of the semiconductor device described in Embodiment 1 will be described with reference to FIG. 13. FIG. 13 shows the protection circuit 101a, the protection-circuit-control-circuit portion 102, the rectifier circuit portion 103, and the power supply control circuit portion 104 of the semiconductor device 100 in Embodiment 1, and particularly shows an example of a specific circuit structure of the protection circuit 101a and the protection-circuit-control-circuit portion 102.

In FIG. 13, the protection circuit 101a includes protection circuits 1301a to 1301c. In this embodiment, an example in which three protection circuits are connected is described; however, the present invention is not limited thereto, and given number of protection circuits can be provided.

The protection circuit 1301a in FIG. 13 includes a transistor 1302a and a transistor 1303a as a variable resistance element. One of a source electrode and a drain electrode of the transistor 1302a is connected to IN1, and the other thereof is connected to the rectifier circuit portion 103. Further, a gate electrode of the transistor 1302a is connected to a protection-circuit-control-circuit portion 102a. One of a source electrode and a drain electrode of the transistor 1303a is connected to IN1, and the other thereof is connected to the rectifier circuit portion 103. Further, a gate electrode of the transistor 1303a is connected to IN2.

The protection-circuit-control-circuit portion 102a includes a detection portion having a resistor R1a and a resistor R2a, and a comparator portion having a p-channel transistor 303a, an n-channel transistor 304a, and a phase compensation capacitor 305a.

The resistor R1a and the resistor R2a are sequentially connected in series between the node IN2 and the node N1 to which an output of the rectifier circuit portion 103 is inputted. One of a source electrode and a drain electrode of the transistor 303a is connected to the node N1, and the other thereof is connected to one of a source electrode and a drain electrode of the transistor 304a. A gate electrode of the transistor 303a is connected to the node N2a between the resistor R1a and the resistor R2a. The other of the source electrode and the drain electrode of the transistor 304a is connected to IN2, and a reference voltage VREF determined in the power supply control circuit portion 104 is inputted to a gate electrode of the transistor 304a.

The phase compensation capacitor 305a is provided between IN2 and a node N31 to which the gate electrode of the transistor 1302a, the other of the source electrode and the drain electrode of the transistor 303a, and the one of the source electrode and the drain electrode of the transistor 304a are connected.

The protection circuit 1301b in FIG. 13 includes a transistor 1302b and a transistor 1303b as a variable resistance element. One of a source electrode and a drain electrode of the transistor 1302b is connected to IN1, and the other thereof is connected to the rectifier circuit portion 103. Further, a gate electrode of the transistor 1302b is connected to a protection-circuit-control-circuit portion 102b. One of a source electrode and a drain electrode of the transistor 1303b is connected to IN1, and the other thereof is connected to the rectifier circuit portion 103. Further, a gate electrode of the transistor 1303b is connected to IN2.

The protection-circuit-control-circuit portion 102b includes a detection portion having a resistor R1b and a resistor R2b, and a comparator portion having a p-channel transistor 303b, an n-channel transistor 304b, and a phase compensation capacitor 305b.

The resistor R1b and the resistor R2b are sequentially connected in series between the node IN2 and the node N1 to which an output of the rectifier circuit portion 103 is inputted. One of a source electrode and a drain electrode of the transistor 303b is connected to the node N1, and the other thereof is connected to one of a source electrode and a drain electrode of the transistor 304b. A gate electrode of the transistor 303b is connected to the node N2b between the resistor R1b and the resistor R2b. The other of the source electrode and the drain electrode of the transistor 304b is connected to IN2, and a reference voltage VREF determined in the power supply control circuit portion 104 is inputted to a gate electrode of the transistor 304b.

The phase compensation capacitor 305b is provided between IN2 and a node N32 to which the gate electrode of the transistor 1302b, the other of the source electrode and the drain electrode of the transistor 303b, and the one of the source electrode and the drain electrode of the transistor 304b are connected.

The protection circuit 1301c in FIG. 13 includes a transistor 1302c and a transistor 1303c as a variable resistance element. One of a source electrode and a drain electrode of the transistor 1302c is connected to IN1, and the other thereof is connected to the rectifier circuit portion 103. Further, a gate electrode of the transistor 1302c is connected to a protection-circuit-control-circuit portion 102c. One of a source electrode and a drain electrode of the transistor 1303c is connected to IN1, and the other thereof is connected to the rectifier circuit portion 103. Further, a gate electrode of the transistor 1303c is connected to IN2.

The protection-circuit-control-circuit portion 102c includes a detection portion having a resistor R1c and a resistor R2c, and a comparator portion having a p-channel transistor 303c, an n-channel transistor 304c, and a phase compensation capacitor 305c.

The resistor R1c and the resistor R2c are sequentially connected in series between the node IN2 and the node N1 to which an output of the rectifier circuit portion 103 is inputted. One of a source electrode and a drain electrode of the transistor 303c is connected to the node N1, and the other thereof is connected to one of a source electrode and a drain electrode of the transistor 304c. A gate electrode of the transistor 303c is connected to the node N2c between the resistor R1c and the resistor R2c. The other of the source electrode and the drain electrode of the transistor 304c is connected to IN2, and a reference voltage VREF determined in the power supply control circuit portion 104 is inputted to a gate electrode of the transistor 304c.

The phase compensation capacitor 305c is provided between IN2 and a node N33 to which the gate electrode of the transistor 1302c, the other of the source electrode and the drain electrode of the transistor 303c, and the one of the source electrode and the drain electrode of the transistor 304c are connected.

An AC voltage is inputted from IN1 and IN2 to the rectifier circuit portion 103 through the protection circuit 101a, and the rectifier circuit portion 103 supplies a DC voltage to the protection-circuit-control-circuit portion 102a.

A potential applied to the gate electrode of the transistor 1302a, that is, a potential of the node N31 is determined by operation of the transistor 303a. That is, in the case where the transistor 304a operates in a saturation region and the transistor 303a is turned off, the potential of the node N31 is approximately the same as a potential of IN2. While in the case where the transistor 304a operates in a saturation region and the transistor 303a is turned on, a current flows from the transistor 303a into the node N31, so that the potential of the node N31 increases. When the potential of the node N31 increases, the transistor 1302a does not operate. That is, a current does not flow through the transistor 1302a, so that input resistance of the protection circuit 1301a can be increased.

The transistor 1303a operates with a potential difference between a potential of the node N2a and a potential of the node N1. For example, when input power increases and the potential of the node N1 increases, the potential difference between the potential of the node N1 and the potential of the node N2a increases. When the potential difference between the potential of the node N1 and the potential of the node N2a is larger than a threshold value of the transistor 303a, the transistor 303a supplies a current, so that the potential of the node N31 increases.

The potential difference between the potential of the node N1 and the potential of the node N2a is determined by the ratio of the resistor R1a to the resistor R2a. When the voltage after rectification VIN is a predetermined value or larger, the size of each of the resistor R1a and the resistor R2a is determined so that the potential difference between the potential of the node N1 and the potential of the node N2a is larger than the threshold value of the transistor 303a.

In this manner, the protection circuit 1301a is controlled by the protection-circuit-control-circuit portion 102a. Similarly, the protection circuit 1301b is controlled by the protection-circuit-control-circuit portion 102b, and the protection circuit 1301c is controlled by the protection-circuit-control-circuit portion 102c.

In the protection-circuit-control-circuit portions 102a to 102c, the ratio of the resistor R1a to the resistor R2a, the ratio of the resistor R1b to the resistor R2b, and the ratio of the resistor R1c to the resistor R2c are different from one another. That is, the potentials to turn on the transistors 1302a to 1302c can be changed. Accordingly, potentials to turn on the protection circuits 1301a to 1301c can be changed in accordance with an input voltage. Furthermore, input resistance can be changed in accordance with an input voltage.

FIG. 13 shows a structural example of the case where the transistors 1303a to 1303c are separately provided for the protection-circuit-control-circuit portions 102a to 102c, respectively; however, the present invention is not limited thereto, and the transistors 1303a to 1303c can be shared.

This embodiment shows the structural example of the case where the protection-circuit-control-circuit portions 102a to 102c are separately provided; however, the present invention is not limited thereto, and by use of the same circuit structure for the protection-circuit-control-circuit portions 102a to 102c and by setting a plurality of VREFs determined in the power supply control circuit portion 104, potentials to turn on the transistors 1302a to 1302c can be changed. When the potentials to turn on the transistors 1302a to 1302c can be changed, potentials to turn on the protection circuits 1301a to 1301c can be changed. That is, input resistance can be changed in accordance with an input voltage.

By use of the present invention, deterioration of the element characteristic or destruction of the element can be prevented even when the communication distance is short and high power is received.

Embodiment 3

In this embodiment, an example of a manufacturing method of the semiconductor device described in Embodiment 1 will be described with reference to the drawings. In this embodiment, a structure in which an antenna circuit and a semiconductor device are provided over the same substrate will be described. Note that the antenna circuit and the semiconductor device can be formed over one substrate and thin film transistors as transistors included in the semiconductor device can be made, so that miniaturization can be achieved.

First, as shown in FIG. 5A, a separation layer 1903 is formed over a surface of a substrate 1901 with an insulating film 1902 interposed therebetween. Next, an insulating film 1904 which serves as a base film and a semiconductor film 1905 (e.g., a film which includes amorphous silicon) are stacked. Note that the insulating film 1902, the separation layer 1903, the insulating film 1904, and the semiconductor film 1905 can be formed in succession.

Further, the substrate 1901 may be a glass substrate, a quartz substrate, a metal substrate (e.g., a stainless steel substrate or the like), a ceramic substrate, or a semiconductor substrate, such as a Si substrate. Alternatively, a plastic substrate formed of polyethylene terephthalate (PET), polyethylene naphthalate (PEN), polyether sulfone (PES), acrylic, or the like can be used. Note that in this step, the separation layer 1903 is provided over an entire surface of the substrate 1901 with the insulating film 1902 interposed therebetween; however, if necessary, the separation layer may be selectively provided by use of a photolithography method after providing the separation layer over an entire surface of the substrate 1901.

The insulating film 1902 and the insulating film 1904 are formed using an insulating material such as silicon oxide, silicon nitride, silicon oxynitride ($SiO_xN_y$, where x>y>0), or silicon nitride oxide ($SiN_xO_y$, where x>y>0), by a CVD method, a sputtering method, or the like. For example, when the insulating film 1902 and the insulating film 1904 have a two-layer structure, preferably a silicon nitride oxide film is formed as a first insulating film and a silicon oxynitride film is formed as a second insulating film. Alternatively, a silicon nitride film may be formed as a first insulating film and a silicon oxide film may be formed as a second insulating film. The insulating film 1902 serves as a blocking layer which prevents an impurity element from the substrate 1901 from being mixed into the separation layer 1903 or an element formed thereover. The insulating film 1904 serves as a blocking layer which prevents an impurity element from the substrate 1901 or the separation layer 1903 from being mixed into an element formed thereover. By forming the insulating films 1902 and 1904 which serve as blocking layers in this manner, an element formed thereover can be prevented from being adversely affected by an alkali metal such as Na or an alkali earth metal from the substrate 1901, or an impurity element included in the separation layer 1903. Note that when quartz is used as the substrate 1901, the insulating films 1902 and 1904 may be omitted from the structure.

As the separation layer 1903, a metal film, a stacked-layer structure including a metal film and a metal oxide film, or the like can be used. As the metal film, a single-layer structure or a stacked-layer structure is formed using a film formed of any of the elements tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), and iridium (Ir), or of an alloy material or a compound material containing such an element as a main constituent. These materials can be formed by use of a sputtering method, various CVD methods, such as a plasma CVD method, or the like. As the stacked-layer structure including a metal film and a metal oxide film, after the aforementioned metal film is formed, plasma treatment in an oxygen atmosphere or an $N_2O$ atmosphere, or heat treatment in an oxygen atmosphere or an $N_2O$ atmosphere is performed, so that oxide or oxynitride of the metal film can be formed on a surface of the metal film. For example, when a tungsten film is formed as the metal film by a sputtering method, a CVD method, or the like, plasma treatment is performed on the tungsten film so that a metal oxide film formed of tungsten oxide can be formed on a surface of the tungsten film. In this case, oxide of tungsten is expressed as $WO_x$, where x is 2 to 3, and there are cases where x is 2 ($WO_2$), cases where x is 2.5 ($W_2O_5$), cases where x is 2.75 ($W_4O_{11}$), cases where x is 3 ($WO_3$), and the like. When forming the oxide of tungsten, there is no particular limitation on the value of x, and which oxide is to be formed may be determined in accordance with an etching rate or the like. Alternatively, for example, after a metal film (e.g., tungsten) is formed, an insulating film such as silicon oxide ($SiO_2$) may be provided over the metal film by a sputtering method, and metal oxide may also be formed over the metal film (e.g., tungsten oxide over tungsten). In addition, as plasma treatment, the above high-density plasma treatment may also be performed, for example. Further, besides the metal oxide film, metal nitride or metal oxynitride may also be used. In such a case, plasma treatment or heat treatment in a nitrogen atmosphere or an atmosphere of nitrogen and oxygen may be performed on the metal film.

The semiconductor film 1905 is formed with a thickness of 25 to 200 nm (preferably, 30 to 150 nm) by a sputtering method, an LPCVD method, a plasma CVD method, or the like.

Next, the semiconductor film 1905 is crystallized by being irradiated with a laser beam. The semiconductor film 1905 may be crystallized by a method which combines laser beam irradiation with a thermal crystallization method which employs RTA or an annealing furnace or a thermal crystallization method which employs a metal element for promoting crystallization, or the like. Subsequently, as shown in FIG. 5B, the obtained crystalline semiconductor film is etched into a desired shape to form crystallized crystalline semiconductor films 1905a to 1905f, and a gate insulating film 1906 is formed so as to cover the semiconductor films 1905a to 1905f.

Note that the gate insulating film 1906 is formed using an insulating material such as silicon oxide, silicon nitride, silicon oxynitride ($SiO_xN_y$, where x>y>0), or silicon nitride oxide ($SiN_xO_y$, where x>y>0), by a CVD method, a sputtering method, or the like. For example, when the gate insulating film 1906 has a two-layer structure, preferably a silicon oxynitride film is formed as a first insulating film and a silicon nitride oxide film is formed as a second insulating film. Alternatively, a silicon oxide film may be formed as the first insulating film and a silicon nitride film may be formed as the second insulating film.

An example of a manufacturing step of the crystalline semiconductor films 1905a to 1905f is briefly described below. First, an amorphous semiconductor film with a film thickness of 50 to 60 nm is formed by a plasma CVD method. Next, a solution containing nickel, which is a metal element for promoting crystallization, is retained on the amorphous semiconductor film, and then dehydrogenation treatment (at 500° C., for one hour) and thermal crystallization treatment (at 550° C., for four hours) are performed on the amorphous semiconductor film to form a crystalline semiconductor film. Subsequently, the crystalline semiconductor film is irradiated with a laser beam, and the crystalline semiconductor films 1905a to 1905f are formed by use of a photolithography method. Note that the amorphous semiconductor film may be crystallized just by laser beam irradiation, without performing thermal crystallization which employs a metal element for promoting crystallization.

Note that as a laser oscillator for crystallization, a continuous wave laser beam (a CW laser beam) or a pulsed wave laser beam (a pulsed laser beam) can be used. As a laser beam which can be used here, a laser beam emitted from one or more of the following can be used: a gas laser, such as an Ar laser, a Kr laser, or an excimer laser; a laser whose medium is single crystalline YAG, $YVO_4$, forsterite ($Mg_2SiO_4$), $YAlO_3$, or $GdVO_4$, to which one or more of Nd, Yb, Cr, Ti, Ho, Er, Tm, and Ta has been added as a dopant; or polycrystalline (ceramic) YAG, $Y_2O_3$, $YVO_4$, $YAlO_3$, or $GdVO_4$, to which one or more of Nd, Yb, Cr, Ti, Ho, Er, Tm, and Ta has been added as a dopant; a glass laser; a ruby laser; an alexandrite laser; a Ti:sapphire laser; a copper vapor laser; or a gold vapor laser. Crystals with a large grain size can be obtained by irradiation with fundamental waves of such laser beams or second to fourth harmonics of the fundamental waves. For example, the second harmonic (532 nm) or the third harmonic (355 nm) of an $Nd:YVO_4$ laser (fundamental wave of 1064 nm) can be used. In this case, a power density of approximately 0.01 to 100 $MW/cm^2$ (preferably, 0.1 to 10 $MW/cm^2$) is necessary. Irradiation is conducted with a scanning rate of approximately 10 to 2000 cm/sec. Note that a laser using, as a medium, single crystalline YAG, $YVO_4$, forsterite ($Mg_2SiO_4$), $YAlO_3$, or $GdVO_4$, to which one or more of Nd, Yb, Cr, Ti, Ho, Er, Tm, and Ta has been added as a dopant, or polycrystalline (ceramic) YAG; $Y_2O_3$, $YVO_4$, $YAlO_3$, or $GdVO_4$, to which one or more of Nd, Yb, Cr, Ti, Ho, Er, Tm, and Ta has been added as a dopant; an Ar ion laser; or a Ti:sapphire laser, can be continuously oscillated. Furthermore, pulse oscillation thereof can be performed at a repetition rate of 10 MHz or more by performing Q-protection circuit operation, mode locking, or the like. When a laser beam is oscillated at a repetition rate of 10 MHz or more, during the time in which a semiconductor film is melted by the laser beam and then solidifies, the semiconductor film is irradiated with a next pulse. Accordingly, unlike in a case of using a pulsed laser with a low repetition rate, a solid-liquid interface can be continuously moved in the semiconductor film; therefore, crystal grains which have grown continuously in a scanning direction can be obtained.

Further, the above-described high-density plasma treatment may be performed on the semiconductor films 1905a to 1905f to oxidize or nitride surfaces thereof, to form the gate insulating film 1906. For example, the gate insulating film 1906 is formed by plasma treatment in which a mixed gas which contains a rare gas such as He, Ar, Kr, or Xe, and oxygen, nitrogen oxide ($NO_2$), ammonia, nitrogen, hydrogen, or the like, is introduced. When excitation of the plasma in this case is performed by introduction of a microwave, high density plasma can be generated at a low electron temperature. The surface of the semiconductor film can be oxidized or nitrided by oxygen radicals (OH radicals may be included) or nitrogen radicals (NH radicals may be included) generated by this high-density plasma.

By treatment using such high-density plasma, an insulating film with a thickness of 1 to 20 nm, typically 5 to 10 nm, is formed over the semiconductor film. Because the reaction in this case is a solid-phase reaction, interface state density between the insulating film and the semiconductor film can be made very low. Because such high-density plasma treatment oxidizes (or nitrides) a semiconductor film (crystalline silicon, or polycrystalline silicon) directly, the insulating film can be formed with very little unevenness in its thickness. In addition, since crystal grain boundaries of crystalline silicon are also not strongly oxidized, very favorable conditions result. That is, by the solid-phase oxidation of the surface of the semiconductor film by the high-density plasma treatment shown here, an insulating film with good uniformity and low interface state density can be formed without excessive oxidation at crystal grain boundaries.

Note that as the gate insulating film 1906, just an insulating film formed by the high-density plasma treatment may be used, or an insulating film of silicon oxide, silicon oxynitride, silicon nitride, or the like may be formed thereover by a CVD method which employs plasma or a thermal reaction, to make stacked layers. In any case, when transistors include an insulating film formed by high-density plasma in a part of a gate insulating film or in the whole of a gate insulating film, unevenness in characteristics can be reduced.

Furthermore, in the semiconductor films 1905a to 1905f which are obtained by crystallizing a semiconductor film by irradiation with a continuous wave laser beam or a laser beam oscillated at a repetition rate of 10 MHz or more which is scanned in one direction, crystals grow in the scanning direction of the beam. When transistors are arranged so that the scanning direction is aligned with the channel length direction (the direction in which a carrier flows when a channel formation region is formed) and the above-described gate insulating layer is used in combination with the transistors, thin film transistors (TFTs) with less variation in characteristics and high electron field-effect mobility can be obtained.

Next, a first conductive film and a second conductive film are stacked over the gate insulating film 1906. Here, the first conductive film is formed with a thickness of 20 to 100 nm using a CVD method, a sputtering method, or the like. The second conductive film is formed with a thickness of 100 to 400 nm. The first conductive film and the second conductive film are formed using an element such as tantalum (Ta), tungsten (W), titanium (Ti), molybdenum (Mo), aluminum (Al), copper (Cu), chromium (Cr), or niobium (Nb), or using an alloy material or a compound material containing such an element as a main constituent. Alternatively, they are formed using a semiconductor material typified by polycrystalline silicon doped with an impurity element such as phosphorus. As examples of a combination of the first conductive film and the second conductive film, a tantalum nitride film and a tungsten film, a tungsten nitride film and a tungsten film, a molybdenum nitride film and a molybdenum film, and the like can be given. Because tungsten and tantalum nitride have high heat resistance, heat treatment for thermal activation can be performed after the first conductive film and the second conductive film are formed. In addition, in the case of using a three-layer structure instead of a two-layer structure, a stacked-layer structure including a molybdenum film, an aluminum film, and a molybdenum film may be used.

Next, a resist mask is formed using a photolithography method, and etching treatment for forming a gate electrode and a gate line is conducted, forming gate electrodes 1907 over the semiconductor films 1905a to 1905f. Here, an example in which the gate electrodes 1907 have a stacked-layer structure which includes a first conductive film 1907a and a second conductive film 1907b is described.

Next, as shown in FIG. 5C, the gate electrodes 1907 are used as masks, and an impurity element which imparts n-type conductivity is added to the semiconductor films 1905a to 1905f at a low concentration by an ion doping method or an ion implantation method. Subsequently, a resist mask is selectively formed by a photolithography method, and an impurity element which imparts p-type conductivity is added at a high concentration to the semiconductor films 1905a to 1905f. As an impurity element which imparts n-type conductivity, phosphorus (P), arsenic (As), or the like can be used. As an impurity element which imparts p-type conductivity, boron (B), aluminum (Al), gallium (Ga), or the like can be used. Here, phosphorus (P) is used as an impurity element which imparts n-type conductivity, and is selectively introduced into the semiconductor films 1905a to 1905f such that they contain phosphorus (P) at a concentration of $1\times10^{15}$ to $1\times10^{19}/cm^3$. Thus, n-type impurity regions 1908 are formed. Further, boron (B) is used as an impurity element which imparts p-type conductivity, and is selectively introduced into the semiconductor films 1905c and 1905e such that they contain boron (B) at a concentration of $1\times10^{19}$ to $1\times10^{20}/cm^3$. Thus, p-type impurity regions 1909 are formed.

Next, an insulating film is formed so as to cover the gate insulating film 1906 and the gate electrodes 1907. The insulating film is formed as a single layer or stacked layers of a film containing an inorganic material such as silicon, oxide of silicon, or nitride of silicon, or a film containing an organic material such as an organic resin, by a plasma CVD method, a sputtering method, or the like. Next, the insulating film is selectively etched using anisotropic etching which etches mainly in a perpendicular direction, forming insulating films 1910 (also referred to as side walls) which are in contact with side surfaces of the gate electrodes 1907. The insulating films 1910 are used as masks for doping when LDD (lightly doped drain) regions are formed.

Next, using a resist mask formed by a photolithography method, the gate electrodes 1907, and the insulating films 1910 as masks, an impurity element which imparts n-type conductivity is added at a high concentration to the semiconductor films 1905a, 1905b, 1905d, and 1905f, to form n-type impurity regions 1911. Here, phosphorus (P) is used as an impurity element which imparts n-type conductivity, and it is selectively introduced into the semiconductor films 1905a, 1905b, 1905d, and 1905f such that they contain phosphorus (P) at a concentration of $1\times10^{19}$ to $1\times10^{20}/cm^3$. Thus, the n-type impurity regions 1911, which have a higher concentration than the impurity regions 1908, are formed.

By the above-described steps, n-channel thin film transistors 1900a, 1900b, 1900d, and 1900f, and p-channel thin film transistors 1900c and 1900e are formed, as shown in FIG. 5D.

Note that in the n-channel thin film transistor 1900a, a channel formation region is formed in a region of the semiconductor film 1905a which overlaps with the gate electrode 1907; the impurity regions 1911 which each form either a source region or a drain region are formed in regions which do not overlap with the gate electrode 1907 and the insulating films 1910; and low concentration impurity regions (LDD regions) are formed in regions which overlap with the insulating films 1910 and which are between the channel formation region and the impurity regions 1911. Further, the n-channel thin film transistors 1900b, 1900d, and 1900f are similarly provided with channel formation regions, low concentration impurity regions, and the impurity regions 1911.

Further, in the p-channel thin film transistor 1900c, a channel formation region is formed in a region of the semiconductor film 1905c which overlaps with the gate electrode 1907, and the impurity regions 1909 which each form either a source region or a drain region are formed in regions which do not overlap with the gate electrode 1907. Further, the p-channel thin film transistor 1900e is similarly provided with a channel formation region and the impurity regions 1909. Note that here, the p-channel thin film transistors 1900c and 1900e are not provided with LDD regions; however, the p-channel thin film transistors may be provided with an LDD region, and the n-channel thin film transistor is not necessarily provided with an LDD region.

Figure 6A:
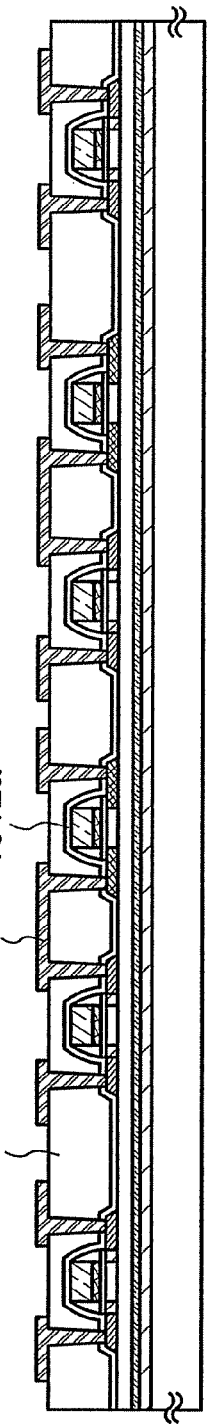
FIGS. 6A to 6C are diagrams showing a method for manufacturing a semiconductor device of the present invention.

Next, as shown in FIG. 6A, an insulating film is formed as a single layer or stacked layers so as to cover the semiconductor films 1905a to 1905f, the gate electrodes 1907, and the like; and conductive films 1913, which are electrically connected to the impurity regions 1909 and 1911 which form the source regions or the drain regions of the thin film transistors 1900a to 1900f, are formed over the insulating film. The insulating film is formed as a single layer or stacked layers, using an inorganic material, such as oxide of silicon or nitride of silicon, an organic material, such as polyimide, polyamide, benzocyclobutene, acrylic, or epoxy, a siloxane material, or the like, by a CVD method, a sputtering method, an SOG method, a droplet discharge method, a screen printing method, or the like. Here, the insulating film has a two-layer structure. A silicon nitride oxide film is formed as a first insulating film 1912a, and a silicon oxynitride film is formed as a second insulating film 1912b. Further, the conductive films 1913 form source electrodes and drain electrodes of the semiconductor films 1905a to 1905f.

Note that before the insulating films 1912a and 1912b are formed or after one or more thin films of the insulating films 1912a and 1912b are formed, heat treatment is preferably conducted for recovering the crystallinity of the semiconductor film, for activating an impurity element which has been added to the semiconductor film, or for hydrogenating the semiconductor film. As the heat treatment, thermal annealing, a laser annealing method, an RTA method, or the like is preferably used.

The conductive films 1913 are formed as a single layer or stacked layers, using any of the elements aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing one of the above-mentioned elements as a main constituent, by a CVD method, a sputtering method, or the like. An alloy material containing aluminum as a main constituent corresponds to, for example, a material which contains aluminum as a main constituent and also contains nickel, or an alloy material which contains aluminum as a main constituent and which also contains nickel and one or both of carbon and silicon. The conductive films 1913 preferably employ, for example, a stacked-layer structure including a barrier film, an aluminum-silicon film, and a barrier film, or a stacked-layer structure including a barrier film, an aluminum-silicon film, a titanium nitride film, and a barrier film. Note that a barrier film corresponds to a thin film formed from titanium, nitride of titanium, molybdenum, or nitride of molybdenum. Aluminum and aluminum silicon, which have low resistance and are inexpensive, are ideal materials for forming the conductive films 1913. Further, generation of a hillock of aluminum or aluminum silicon can be prevented when upper and lower barrier layers are formed. Furthermore, when the barrier film is formed from titanium, which is a highly-reducible element, even if a thin natural oxide film is formed over the crystalline semiconductor film, the natural oxide film is chemically reduced, so good contact with the crystalline semiconductor film can be obtained.

Next, an insulating film 1914 is formed so as to cover the conductive films 1913, and over the insulating film 1914, conductive films 1915a and 1915b, which are each electrically connected to the conductive films 1913 which form source electrodes and drain electrodes of the semiconductor films 1905a and 1905f, are formed. Further, conductive films 1916a and 1916b, which are each electrically connected to the conductive films 1913 which form source electrodes and drain electrodes of the semiconductor films 1905b and 1905e, are formed. Note that the conductive films 1915a and 1915b may be formed of the same material at the same time as the conductive films 1916a and 1916b. The conductive films 1915a and 1915b and the conductive films 1916a and 1916b can be formed using any of the materials that the conductive films 1913 can be formed of, mentioned above.

Figure 6B:
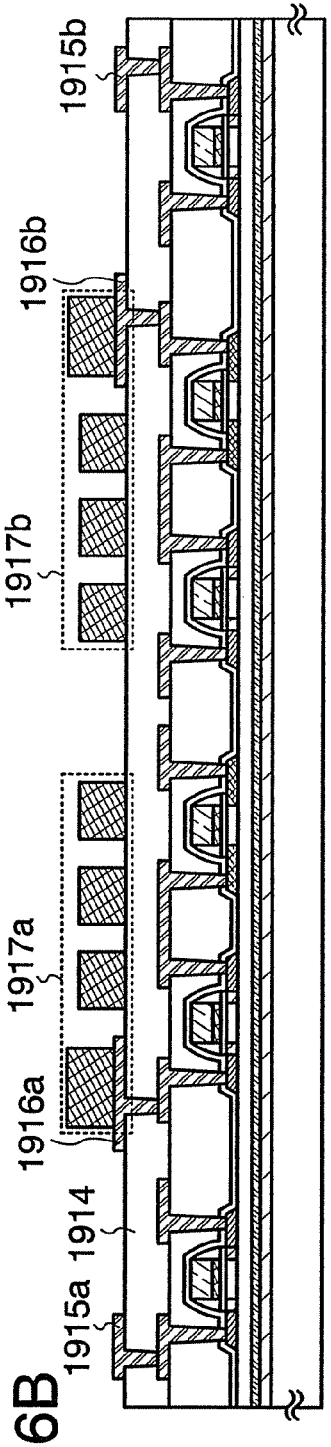

Next, as shown in FIG. 6B, conductive films 1917a and 1917b which serve as antennas are formed such that they are electrically connected to the conductive films 1916a and 1916b.

Note that the insulating film 1914 can be provided by a CVD method, a sputtering method, or the like as a single-layer structure which includes an insulating film containing oxygen and/or nitrogen, such as silicon oxide ($SiO_x$), silicon nitride ($SiN_x$), silicon oxynitride ($SiO_xN_y$, where x>y), or silicon nitride oxide ($SiN_xO_y$, where x>y); or a film containing carbon, such as DLC (diamond-like carbon); or an organic material, such as epoxy, polyimide, polyamide, polyvinyl phenol, benzocyclobutene, or acrylic; or a siloxane material, such as a siloxane resin. Alternatively, the insulating film 1914 may have a stacked structure including the above-mentioned materials. Note that a siloxane material corresponds to a material having a Si—O—Si bond. Siloxane has a skeleton structure formed of bonds of silicon (Si) and oxygen (O). As a substituent, an organic group containing at least hydrogen (e.g., an alkyl group or aromatic hydrocarbon) is used. A fluoro group can also be used as a substituent. Alternatively, an organic group containing at least hydrogen and a fluoro group may be used as a substituent.

The conductive films 1917a and 1917b are formed from a conductive material, using a CVD method, a sputtering method, a printing method, such as a screen printing method or a gravure printing method, a droplet discharge method, a dispensing method, a plating method, or the like. The conductive material is any of the elements aluminum (Al), titanium (Ti), silver (Ag), copper (Cu), gold (Au), platinum (Pt), nickel (Ni), palladium (Pd), tantalum (Ta), and molybdenum (Mo), or an alloy material or a compound material containing one of the above-mentioned elements as a main constituent, and has a single-layer structure or a stacked-layer structure.

For example, in the case of using a screen printing method to form the conductive films 1917a and 1917b which serve as antennas, the conductive films 1917a and 1917b can be provided by selectively printing a conductive paste in which conductive particles having a grain size of several nm to several tens of μm are dissolved or dispersed in an organic resin. As conductive particles, metal particles of one or more of any of silver (Ag), gold (Au), copper (Cu), nickel (Ni), platinum (Pt), palladium (Pd), tantalum (Ta), molybdenum (Mo), titanium (Ti), and the like; fine particles of silver halide; or dispersive nanoparticles can be used. In addition, as the organic resin included in the conductive paste, one or more organic resins selected from among organic resins which serve as a binder, a solvent, a dispersing agent, or a coating material for the metal particles can be used. An organic resin such as an epoxy resin or a silicone resin can be given as representative examples. Further, when the conductive film is formed, it is preferable to conduct baking after the conductive paste is applied. For example, in the case of using fine particles containing silver as a main constituent (e.g., the grain size is greater than or equal to 1 nm and less than or equal to 100 nm) as a material for the conductive paste, the conductive film can be obtained by curing by baking at a temperature in the range of 150 to 300° C. Alternatively, fine particles containing solder or lead-free solder as a main constituent may be used. In that case, preferably fine particles having a grain size of 20 μm or less are used. Solder and lead-free solder have advantages such as low cost.

Further, the conductive films 1915a and 1915b can each serve as a wiring which is electrically connected to a battery in a subsequent process. Furthermore, when the conductive films 1917a and 1917b which serve as antennas are formed, another conductive film may be separately formed such that it is electrically connected to the conductive films 1915a and 1915b, and that conductive film may be used as a wiring connected to the battery.

Figure 6C:
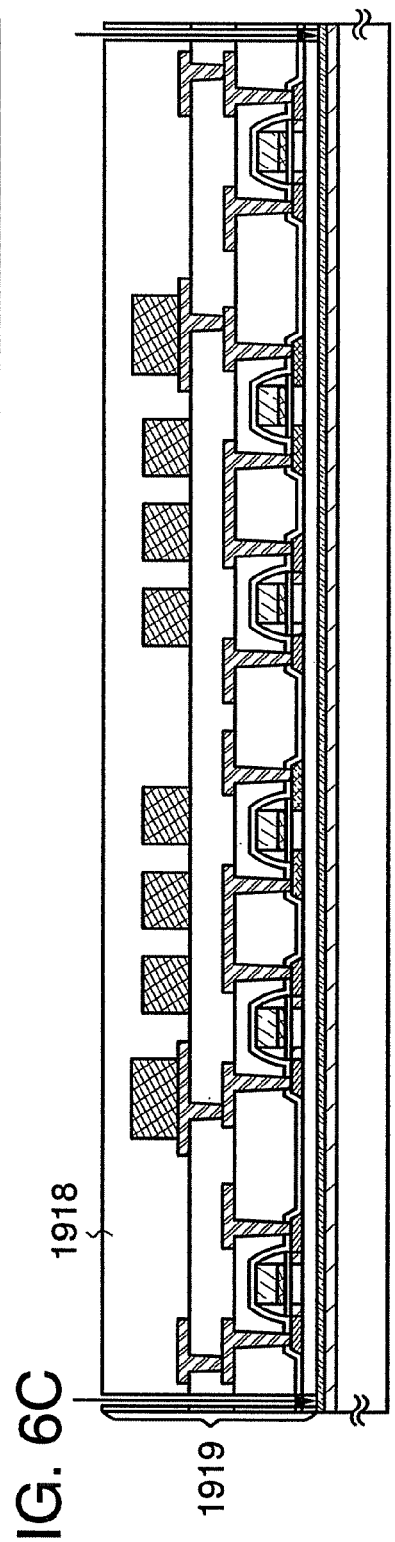

Next, as shown in FIG. 6C, an insulating film 1918 is formed so as to cover the conductive films 1917a and 1917b, and then a layer (hereinafter referred to as an element formation layer 1919) including the thin film transistors 1900a to 1900f, the conductive films 1917a and 1917b, and the like, is separated from the substrate 1901. Here, after using laser beam (e.g., UV light) irradiation to form openings in regions where the thin film transistors 1900a to 1900f are not formed, the element formation layer 1919 can be separated from the substrate 1901 using physical force. Alternatively, before the element formation layer 1919 is separated from the substrate 1901, an etchant may be introduced into the formed openings to selectively remove the separation layer 1903. As the etchant, a gas or liquid containing halogen fluoride or an interhalogen compound is used. For example, chlorine trifluoride ($ClF_3$) is used as a gas containing halogen fluoride. Accordingly, the element formation layer 1919 is separated from the substrate 1901. Note that the separation layer 1903 may be partially left instead of being removed entirely. By leaving a part of the separation layer 1903, consumption of the etchant and treatment time required for removing the separation layer can be reduced. Further, the element formation layer 1919 can be left over the substrate 1901 after the separation layer 1903 is removed. Furthermore, by reusing the substrate 1901 after the element formation layer 1919 is separated from it, cost can be reduced.

The insulating film 1918 can be formed using a CVD method, a sputtering method, or the like as a single-layer structure including an insulating film which contains oxygen and/or nitrogen, such as silicon oxide ($SiO_x$), silicon nitride ($SiN_x$), silicon oxynitride ($SiO_xN_y$, where x>y), or silicon nitride oxide ($SiN_xO_y$, where x>y); or a film containing carbon, such as DLC (diamond-like carbon); or an organic material such as epoxy, polyimide, polyamide, polyvinyl phenol, benzocyclobutene, or acrylic; or a siloxane material such as a siloxane resin. Alternatively, the insulating film 1918 can have a stacked-layer structure including one or more of the above-mentioned films.

In this embodiment, as shown in FIG. 7A, the openings are formed in the element formation layer 1919 by laser beam irradiation, and then a first sheet material 1920 is attached to one surface of the element formation layer 1919 (a surface where the insulating film 1918 is exposed). Then, the element formation layer 1919 is separated from the substrate 1901.

Next, as shown in FIG. 7B, a second sheet material 1921 is attached to the other surface of the element formation layer 1919 (a surface exposed by separation) by performing one or both of heat treatment and pressure treatment. As the first sheet material 1920 and the second sheet material 1921, a hot-melt film or the like can be used.

As the first sheet material 1920 and the second sheet material 1921, films on which antistatic treatment for preventing static electricity or the like has been performed (hereinafter referred to as antistatic films) can be used. Examples of antistatic films are films in which a material that can prevent electrostatic charge is dispersed in a resin, films to which a material that can prevent electrostatic charge is attached, and the like. A film provided with a material that can prevent electrostatic charge may be a film which has a material that can prevent electrostatic charge provided over one of its surfaces, or a film which has a material that can prevent electrostatic charge provided over both of its surfaces. Concerning the film which has a material that can prevent electrostatic charge provided over one of its surfaces, the film may be attached to the layer such that the material that can prevent electrostatic charge is on the inner side of the film or the outer side of the film. Note that the material that can prevent electrostatic charge may be provided over an entire surface of the film, or over a part of the film. As a material that can prevent electrostatic charge, a metal, indium tin oxide (ITO), or a surfactant such as an amphoteric surfactant, a cationic surfactant, or a nonionic surfactant can be used. In addition to that, as an antistatic material, a resin material containing a cross-linked copolymer having a carboxyl group and a quaternary ammonium base on its side chain, or the like can be used. By attaching, mixing, or applying such a material to a film, an antistatic film can be formed. By performing sealing using the antistatic film, the extent to which a semiconductor element is adversely affected by static electricity from outside and the like when dealt with as a product can be reduced.

Note that the battery is formed such that it is connected to the conductive films 1915a and 1915b. The connection with the battery may be made before the element formation layer 1919 is separated from the substrate 1901 (at a stage shown in FIG. 6B or FIG. 6C), or after the element formation layer 1919 is separated from the substrate 1901 (at a stage shown in FIG. 7A), or after the element formation layer 1919 is sealed with the first sheet material and the second sheet material (at a stage shown in FIG. 7B). An example in which the element formation layer 1919 and the battery are formed such that they are connected to each other is described below with reference to FIGS. 8A and 8B and FIGS. 9A and 9B.

In FIG. 6B, conductive films 1931a and 1931b, which are electrically connected to the conductive films 1915a and 1915b, respectively, are formed at the same time as the conductive films 1917a and 1917b which serve as antennas. Next, the insulating film 1918 is formed so as to cover the conductive films 1917a and 1917b and the conductive films 1931a and 1931b. Then, openings 1932a and 1932b are formed so as to expose surfaces of the conductive films 1931a and 1931b. Subsequently, as shown in FIG. 8A, after openings are formed in the element formation layer 1919 by laser beam irradiation, the first sheet material 1920 is attached to one surface of the element formation layer 1919 (the surface where the insulating film 1918 is exposed); and then, the element formation layer 1919 is separated from the substrate 1901.

Next, as shown in FIG. 8B, the second sheet material 1921 is attached to the other surface (a surface exposed by separation) of the element formation layer 1919, and the element formation layer 1919 is then separated from the first sheet material 1920. Accordingly, here, a sheet material with weak adhesion is used as the first sheet material 1920. Then, conductive films 1934a and 1934b, which are electrically connected to the conductive films 1931*a* and 1931*b*, respectively, through the openings 1932*a* and 1932*b*, are selectively formed.

The conductive films 1934*a* and 1934*b* are formed of a conductive material, using a CVD method, a sputtering method, a printing method such as a screen printing method or a gravure printing method, a droplet discharge method, a dispensing method, a plating method, or the like. The conductive material is any of the elements aluminum (Al), titanium (Ti), silver (Ag), copper (Cu), gold (Au), platinum (Pt), nickel (Ni), palladium (Pd), tantalum (Ta), and molybdenum (Mo), or an alloy material or a compound material containing one of the above-mentioned elements as a main constituent, and has a single-layer structure or a stacked-layer structure.

Note that here, an example in which the conductive films 1934*a* and 1934*b* are formed after the element formation layer 1919 is separated from the substrate 1901 is described; however, the element formation layer 1919 may be separated from the substrate 1901 after the conductive films 1934*a* and 1934*b* are formed.

Next, as shown in FIG. 9A, in the case where a plurality of elements is formed over the substrate, the element formation layer 1919 is separated into separate elements. A laser irradiation apparatus, a dicing apparatus, a scribing apparatus, or the like can be used for the separation. Here, the plurality of elements formed over one substrate is separated from one another by laser beam irradiation.

Next, as shown in FIG. 9B, the separated element is electrically connected to connection terminals of the battery. Here, conductive films 1936*a* and 1936*b* provided over a substrate 1935, which serve as connection terminals of the battery are connected to the conductive films 1934*a* and 1934*b* provided over the element formation layer 1919, respectively. Here, a case is shown in which the conductive film 1934*a* and the conductive film 1936*a*, or the conductive film 1934*b* and the conductive film 1936*b*, are pressure-bonded to each other with a material having an adhesive property such as an anisotropic conductive film (ACF) or an anisotropic conductive paste (ACP) interposed therebetween, so that they are electrically connected to each other. Here, an example is shown in which conductive particles 1938 contained in a resin 1937 having an adhesive property are used for connection. Alternatively, connection can be performed using a conductive adhesive agent such as a silver paste, a copper paste, or a carbon paste, or using solder bonding, or the like.

In a case where the battery is larger than the element, by forming a plurality of elements over one substrate, as shown in FIGS. 8A and 8B and FIGS. 9A and 9B, separating the elements, then connecting the elements to the battery, the number of elements which can be formed over one substrate can be increased. Accordingly, a semiconductor device can be formed at low cost.

According to the above-described steps, a semiconductor device can be manufactured. Note that in this embodiment, a step in which separation is performed after forming elements such as thin film transistors over the substrate has been described; however, the substrate over which elements are formed may be used as a product without performing separation. Further, when elements such as thin film transistors are provided over a glass substrate, and the glass substrate is then polished on the side opposite to the surface over which the elements are provided; or when a semiconductor substrate such as Si or the like is used and MOS transistors are formed, and the semiconductor substrate is then polished, thinning and miniaturization of a semiconductor device can be achieved.

Note that this embodiment can be combined with Embodiment Mode or other embodiments in this specification.

Embodiment 4

In this embodiment, uses of a semiconductor device, which is an example of a usage pattern of a semiconductor device which is capable of transmitting and receiving information wirelessly which has been described in Embodiments 1 and 2, will be described. A semiconductor device can be included in, for example, bills, coins, securities, bearer bonds, documents (such as driver's licenses or resident's cards), packaging containers (such as wrapping paper or bottles), storage media (such as DVD software or video tapes), vehicles (such as bicycles), personal belongings (such as bags or glasses), foods, plants, animals, human bodies, clothing, everyday articles, products such as electronic devices, identification tags on luggage, and the like. A semiconductor device can be used as a so-called ID label, ID tag, or ID card. An electronic device refers to a liquid crystal display device, an EL display device, a television set (also called simply a television, a TV receiver, or a television receiver), a mobile phone, or the like. Below, applications of the present invention and examples of products which include an application of the present invention are described with reference to FIGS. 10A to 10E.

Figure 10A:
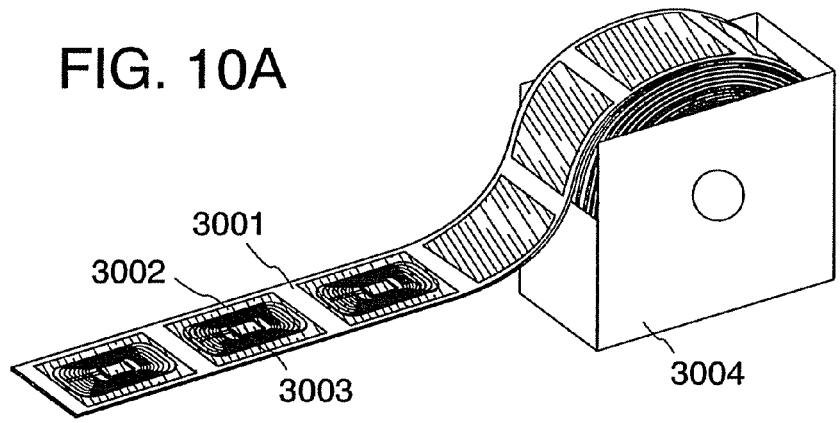
FIGS. 10A to 10E are diagrams showing a semiconductor device and a usage pattern of the semiconductor device of the present invention.

FIG. 10A shows examples of completed semiconductor devices relating to the present invention. A plurality of ID labels 3003 each including a semiconductor device 3002 are formed on a label board 3001 (separate paper). The ID labels 3003 are stored in a box 3004. Further, on the ID label 3003, there is information about a product or service (a product name, a brand, a trademark, a trademark owner, a seller, a manufacturer, or the like). Meanwhile, an ID number that is unique to the product (or the type of product) is assigned to the included semiconductor device, so that forgery, infringement of intellectual property rights such as patent rights and trademark rights, and illegal behavior such as unfair competition can easily be detected. In addition, a large amount of information that cannot be clearly shown on a container of the product or the label (for example, production area, selling area, quality, raw materials, efficacy, use, quantity, shape, price, production method, method of use, time of production, time of use, expiration date, instructions for the product, information about the intellectual property of the product, or the like) can be inputted to the semiconductor device so that a client or a consumer can access the information using a simple reader. Further, the semiconductor device is structured such that the producer of a product can easily rewrite or erase, for example, the information, but a client or a consumer cannot. Note that a structure where the semiconductor device has a display portion and can display the information may be employed.

Figure 10B:
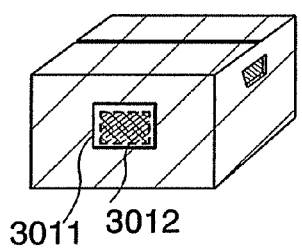

FIG. 10B shows a label-shaped semiconductor device 3011 which includes a semiconductor device 3012. By providing a product with the semiconductor device 3011, management of the product can be simplified. For example, in a case where the product is stolen, the product can be traced, so the culprit can be identified quickly. Thus, by providing the semiconductor device, products that are superior in so-called traceability can be distributed.

Figure 10C:
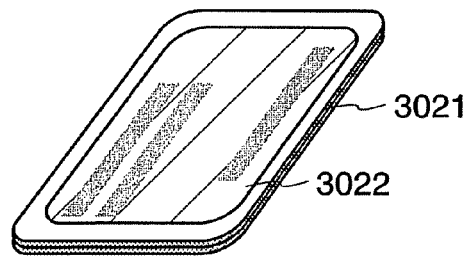

FIG. 10C shows an example of a completed ID card 3021 including a semiconductor device 3022. The ID card 3021 may be any kind of card: a cash card, a credit card, a prepaid card, an electronic ticket, electronic money, a telephone card, a membership card, or the like. Further, a structure in which a display portion is provided on a surface of the ID card 3021 and various information is displayed may be employed.

Figure 10D:
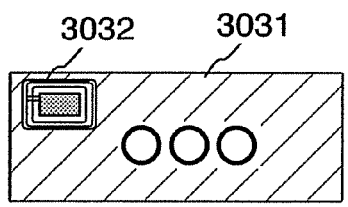

FIG. 10D shows a completed bearer bond 3031. A semiconductor device 3032 is embedded in the bearer bond 3031 and is protected by a resin which forms the periphery of the semiconductor device. Here, the resin is filled with a filler. The bearer bond 3031 can be formed in the same manner as a semiconductor device of the present invention. Note that the aforementioned bearer bond may be a stamp, a ticket, an admission ticket, a merchandise coupon, a book coupon, a stationery coupon, a beer coupon, a rice coupon, various types of gift coupon, various types of service coupon, or the like. Needless to say, the bearer bond is not limited thereto. Further, when the semiconductor device 3032 of the present invention is provided in bills, coins, securities, bearer bonds, documents, or the like, an authentication function can be provided, and by use of the authentication function, forgery can be prevented.

Figure 10E:
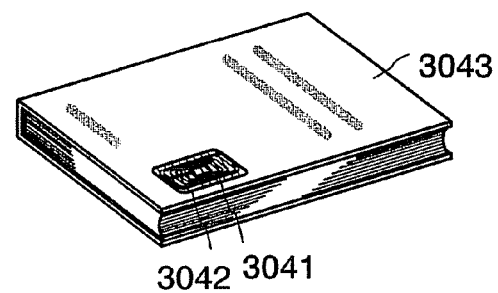

FIG. 10E shows a book 3043 to which an ID label 3041 which includes a semiconductor device 3042 is attached. The semiconductor device 3042 of the present invention is firmly attached in or on goods by being attached to a surface or embedded, for example. As shown in FIG. 10E, the semiconductor device 3042 can be embedded in the paper of a book, or embedded in an organic resin of a package. Because the semiconductor device 3042 of the present invention can be small, thin, and lightweight, it can be firmly attached to or in goods without spoiling their design.

Further, although not shown here, the efficiency of a system such as an inspection system can be improved by providing the semiconductor device of the present invention in, for example, packaging containers, storage media, personal belongings, foods, clothing, everyday articles, electronic devices, or the like. Furthermore, by providing the semiconductor device on or in a vehicle, counterfeit and theft can be prevented. Living things such as animals can be easily identified by implanting the individual living things with semiconductor devices. For example, year of birth, sex, breed, and the like can be easily discerned by implanting semiconductor devices in living things such as domestic animals.

Figure 11A:
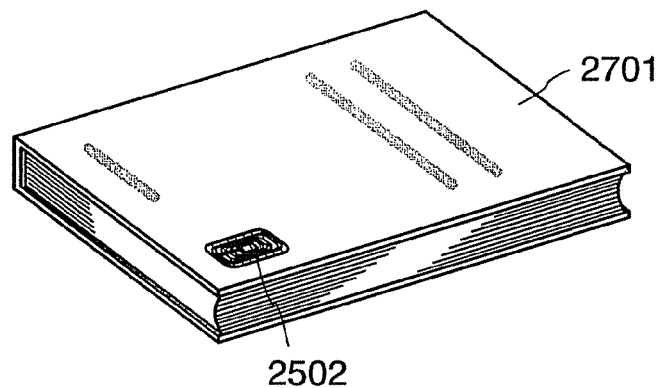
FIGS. 11A to 11D are diagrams showing a semiconductor device and a usage pattern of the semiconductor device of the present invention.
Figure 11B:
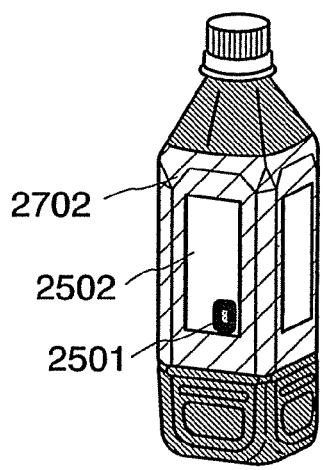

FIGS. 11A and 11B show a book 2701 and a plastic bottle 2702 to which ID labels 2502 which include a semiconductor device of the present invention are attached. Because the semiconductor device that is used in the present invention is very thin, when the ID label is mounted on goods such as the book, function and design are not spoiled. Further, in the case of a non-contact type thin film integrated circuit device, an antenna circuit and a chip can be formed over the same substrate and the non-contact type thin film integrated circuit device can be directly transferred to a product which has a curved surface easily.

Figure 11C:
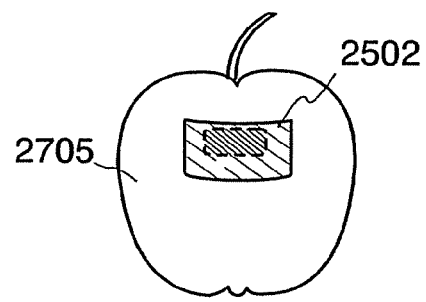
Figure 11D:
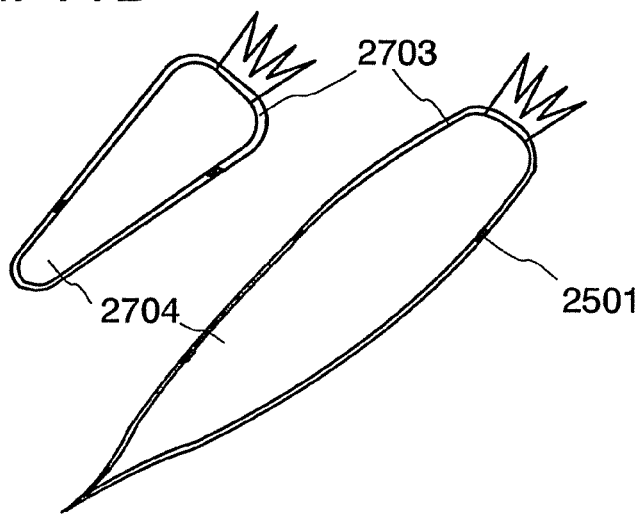

FIG. 11C shows the ID label 2502 which includes the semiconductor device directly attached to fresh food, which is a piece of fruit 2705. Further, FIG. 11D shows examples of fresh food, vegetables 2704, wrapped in a wrapping film. Note that in the case of attaching a chip 2501 to a product, it is possible that the chip 2501 might be taken off; however, in the case of wrapping the product with the wrapping film, it is difficult to take off a wrapping film 2703. Therefore, to some extent, there is the advantage of a crime prevention measure. Note that the semiconductor device of the present invention can be applied to all kinds of products besides the above-mentioned products.

Further, a semiconductor device of the present invention can be provided with the sensor portion, and can detect various information. By having a person, an animal, or the like carry the semiconductor device mounted with the sensor portion with them, various information such as biological information and information on a state of health can be evaluated semipermanently, regardless of location. Below, specific examples of usage patterns of a semiconductor device provided with a sensor portion will be described with reference to the drawings.

Figure 12A:
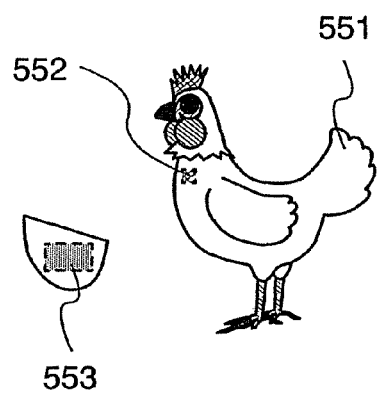
FIGS. 12A to 12D are diagrams showing a semiconductor device and a usage pattern of the semiconductor device of the present invention.

A semiconductor device 552 in which a sensor portion is provided with an element which detects temperature is embedded in an animal 551, and a feedbox or the like provided near the animal 551 is provided with a reader/writer 553 (FIG. 12A). Then, the sensor portion is operated intermittently and evaluated information is stored in the semiconductor device 552. Subsequently, by use of the reader/writer 553 to periodically read information, such as information about body temperature, about the animal 551 which is detected by the semiconductor device 552, the state of health of the animal 551 can be monitored and managed. In this case, charging of a battery provided in the semiconductor device 552 is performed using electromagnetic waves from the reader/writer 553.

Figure 12B:
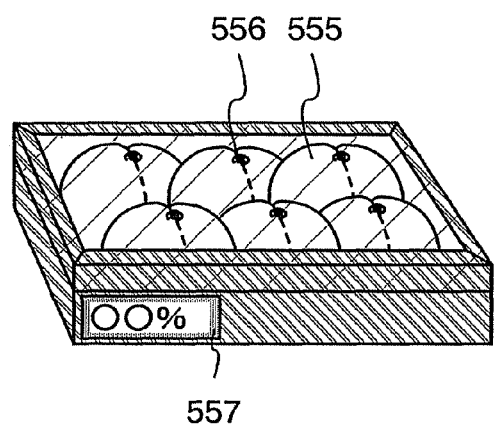

Further, foods 555 are provided with semiconductor devices 556 in which sensor portions include elements which detect gas components such as gas, and wrapping paper or a showcase is provided with a reader/writer 557 (FIG. 12B). Then, the sensor portion is operated intermittently and evaluated information is stored in the semiconductor devices 556. Subsequently, by use of the reader/writer 557 to periodically read information which is detected by the semiconductor devices 556, the freshness of the foods 555 can be managed.

Figure 12C:
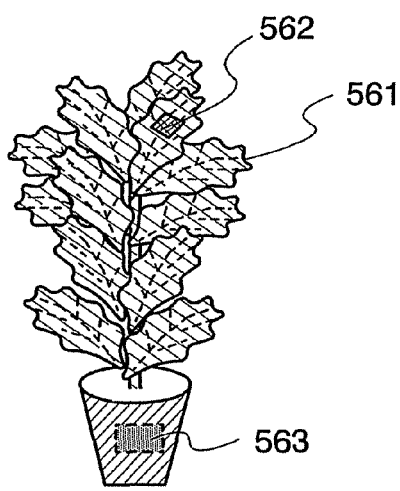

Further, a plant 561 is provided with a semiconductor device 562 in which a sensor portion includes an element which detects light, and a pot of the plant 561 or the like is provided with a reader/writer 563 (FIG. 12C). Then, the sensor portion is operated intermittently and evaluated information is stored in the semiconductor device 562. Subsequently, by use of the reader/writer 563 to periodically read information which is detected by the semiconductor device 562, information about hours of sunshine can be obtained, and information on when the plant will bloom and be shipped can be predicted accurately. In particular, in the semiconductor device 562 which includes an element which detects light, when a solar cell is also provided, a battery provided in the semiconductor device 562 can be charged using light from outside as well as a power supply which employs electromagnetic waves from the reader/writer 563.

Figure 12D:
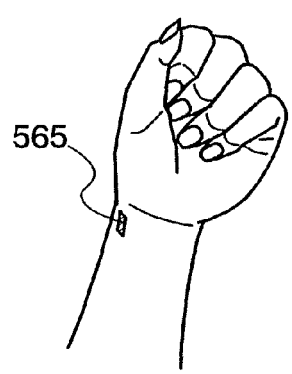

Further, an arm of a human body is provided with a semiconductor device 565 in which a sensor portion includes an element which detects pressure, by attaching or embedding the semiconductor device 565 (FIG. 12D). Then, the sensor portion is operated intermittently and evaluated information is stored in the semiconductor device 565. Subsequently, when a reader/writer is used to read information detected by the semiconductor device 565, information about blood pressure, pulse, and the like can be obtained.

Note that a semiconductor device of the present invention can be applied to all kinds of products besides the above-mentioned products.

This application is based on Japanese Patent Application serial No. 2006-339304 filed with Japan Patent Office on Dec. 18, 2006, the entire contents of which are hereby incorporated by reference.

What is claimed is:
1. A semiconductor device comprising:
a first circuit including a variable resistance element;
a second circuit electrically connected to the first circuit; and
an antenna circuit configured to supply power to the first circuit,
wherein:

a resistance value of the variable resistance element is changed in accordance with the power supplied from the antenna circuit, the variable resistance element is electrically connected in series between the second circuit and the antenna circuit, and the antenna circuit has a first terminal and a second terminal, and the variable resistance element is electrically connected to the first terminal and not connected to the second terminal.

2. The semiconductor device according to claim 1, wherein the variable resistance element includes a Schottky barrier diode.

3. The semiconductor device according to claim 1, wherein the variable resistance element includes a transistor, wherein one of a source and a drain of the transistor is electrically connected to the second circuit, and wherein the other of the source and the drain of the transistor is electrically connected to the antenna circuit.

4. The semiconductor device according to claim 1, wherein the variable resistance element includes at least a first transistor and a second transistor, wherein one of a source and a drain of the first transistor and one of a source and a drain of the second transistor are electrically connected to the second circuit, and wherein the other of the source and the drain of the first transistor and the other of the source and the drain of the second transistor are electrically connected to the antenna circuit.

5. The semiconductor device according to claim 1, wherein the variable resistance element includes a plurality of transistors electrically connected in series, and wherein gate electrodes of the plurality of transistors are electrically connected.

6. The semiconductor device according to claim 1, wherein the variable resistance element includes at least two resistors electrically connected in series and at least one switching element, and wherein the switching element is disposed between the two resistors.

7. The semiconductor device according to claim 1, wherein the first circuit is a protection circuit, and wherein the second circuit is one of a rectifier circuit, a demodulation circuit, and a modulation circuit.

8. The semiconductor device according to claim 1, wherein the variable resistance element has a higher resistance value as the power supplied from the antenna circuit being higher.

9. The semiconductor device according to claim 1, further comprising a battery.

10. A semiconductor device comprising:
a first circuit including a variable resistance element;
a second circuit electrically connected to the first circuit;
an antenna circuit configured to supply power to the first circuit; and
a third circuit including a first portion and a second portion, wherein:
the first portion configured to detect an output of the first circuit,
the second portion configured to make a comparison between an output of the first portion and reference power,
a resistance value of the variable resistance element is changed in accordance with a result of the comparison,
the variable resistance element is electrically connected in series between the second circuit and the antenna circuit, and
the antenna circuit has a first terminal and a second terminal, and the variable resistance element is electrically connected to the first terminal and not connected to the second terminal.

11. The semiconductor device according to claim 10, wherein the variable resistance element includes a Schottky barrier diode.

12. The semiconductor device according to claim 10, wherein the variable resistance element includes a transistor, wherein one of a source and a drain of the transistor is electrically connected to the second circuit, and wherein the other of the source and the drain of the transistor is electrically connected to the antenna circuit.

13. The semiconductor device according to claim 10, wherein the variable resistance element includes at least a first transistor and a second transistor, wherein one of a source and a drain of the first transistor and one of a source and a drain of the second transistor are electrically connected to the second circuit, and wherein the other of the source and the drain of the first transistor and the other of the source and the drain of the second transistor are electrically connected to the antenna circuit.

14. The semiconductor device according to claim 10, wherein the variable resistance element includes a plurality of transistors electrically connected in series, and wherein gate electrodes of the plurality of transistors are electrically connected.

15. The semiconductor device according to claim 10, wherein the variable resistance element includes at least two resistors electrically connected in series and at least one switching element, and wherein the switching element is disposed between the two resistors.

16. The semiconductor device according to claim 10, wherein the first circuit is a protection circuit, and wherein the second circuit is one of a rectifier circuit, a demodulation circuit, and a modulation circuit.

17. The semiconductor device according to claim 10, wherein the variable resistance element has a higher resistance value when the output of the first portion is higher than the reference power comparing when the output of the first portion is lower than the reference power.

18. The semiconductor device according to claim 10, further comprising a battery.

19. A semiconductor device comprising:
a first circuit including a variable resistance element;
a second circuit electrically connected to the first circuit;
an antenna circuit configured to supply power to the first circuit; and
a third circuit including a first portion and a second portion, wherein:
the first portion configured to detect second power outputted from the first circuit and convert the second power into third power to output,
the second portion configured to make a comparison between the third power and reference power and generate a signal in accordance with a result of the comparison,
a resistance value of the variable resistance element is changed in accordance with the signal,
the variable resistance element is electrically connected in series between the second circuit and the antenna circuit, and
the antenna circuit has a first terminal and a second terminal, and the variable resistance element is electrically connected to the first terminal and not connected to the second terminal.

20. The semiconductor device according to claim 19, wherein the variable resistance element includes a Schottky barrier diode.

21. The semiconductor device according to claim 19, wherein the variable resistance element includes a transistor, wherein one of a source and a drain of the transistor is electrically connected to the second circuit, and wherein the other of the source and the drain of the transistor is electrically connected to the antenna circuit.

22. The semiconductor device according to claim 19, wherein the variable resistance element includes at least a first transistor and a second transistor, wherein one of a source and a drain of the first transistor and one of a source and a drain of the second transistor are electrically connected to the second circuit, and wherein the other of the source and the drain of the first transistor and the other of the source and the drain of the second transistor are electrically connected to the antenna circuit.

23. The semiconductor device according to claim 19, wherein the variable resistance element includes a plurality of transistors electrically connected in series, and wherein gate electrodes of the plurality of transistors are electrically connected.

24. The semiconductor device according to claim 19, wherein the variable resistance element includes at least two resistors electrically connected in series and at least one switching element, and wherein the switching element is disposed between the two resistors.

25. The semiconductor device according to claim 19, wherein the first circuit is a protection circuit, and wherein the second circuit is one of a rectifier circuit, a demodulation circuit, and a modulation circuit.

26. The semiconductor device according to claim 19, wherein the variable resistance element has a higher resistance value when the third power is higher than the reference power comparing when the third power is lower than the reference power.

27. The semiconductor device according to claim 19, further comprising a battery.

* * * * *